United States Patent
Cafarelli et al.

(10) Patent No.: US 6,697,337 B1
(45) Date of Patent: Feb. 24, 2004

(54) METHOD AND APPARATUS FOR CAPTURE, ANALYSIS AND DISPLAY OF PACKET INFORMATION SENT IN AN IEEE 802.11 WIRELESS NETWORK

(75) Inventors: Dominick Anthony Cafarelli, Ossining, NY (US); James Peter Anderson, Boonton, NJ (US)

(73) Assignee: Networks Associates Technology, Inc., Santa Clara, CA (US)

( * ) Notice: Subject to any disclaimer, the term of this patent is extended or adjusted under 35 U.S.C. 154(b) by 171 days.

(21) Appl. No.: 09/953,671

(22) Filed: Sep. 17, 2001

(51) Int. Cl.[7] .............................................. H04L 12/26
(52) U.S. Cl. ........................ 370/253; 370/224; 370/310
(58) Field of Search ................................ 370/241, 242, 370/248, 252, 253, 310; 709/223, 224; 714/704, 699

(56) References Cited

U.S. PATENT DOCUMENTS

| | | | | |
|---|---|---|---|---|
| 5,757,772 A | * | 5/1998 | Thornberg et al. | 370/236 |
| 5,799,154 A | * | 8/1998 | Kuriyan | 709/223 |
| 5,912,921 A | * | 6/1999 | Warren et al. | 375/220 |
| 6,363,384 B1 | | 3/2002 | Cookmeyer, II et al. | 707/10 |
| 6,396,287 B1 | | 5/2002 | Kapetanic et al. | 324/623 |
| 6,427,165 B1 | * | 7/2002 | Anderson | 709/217 |
| 6,526,044 B1 | | 2/2003 | Cookmeyer, II et al. | 370/352 |
| 6,529,954 B1 | | 3/2003 | Cookmeyer, II et al. | 709/224 |
| 2002/0152303 A1 | * | 10/2002 | Dispensa | 709/224 |
| 2002/0186660 A1 | | 12/2002 | Bahadiroglu | 370/248 |
| 2003/0012163 A1 | * | 1/2003 | Cafarelli et al. | 370/338 |

FOREIGN PATENT DOCUMENTS

| | | | | |
|---|---|---|---|---|
| EP | 001280296 A1 | * | 1/2003 | H04L/12/24 |
| WO | WO02071627 A2 | * | 12/2002 | |
| WO | WO 03/025597 A1 | * | 3/2003 | G01R/31/08 |

OTHER PUBLICATIONS

AiroPeek, Manual p 1–26.

* cited by examiner

Primary Examiner—Hassan Kizou
Assistant Examiner—D Levitan
(74) Attorney, Agent, or Firm—Silicon Valley IP Group, PC; Kevin J. Zilka; Christopher J. Hamaty

(57) ABSTRACT

A wireless analyzer device for an IEEE 802.11 Wireless LAN is programmed to perform both a per packet processing routine to obtain packet statistics, and a one second timer routine, followed by arranging the packet statistics in a logical manner for display on a computer monitor.

19 Claims, 24 Drawing Sheets

US 6,697,337 B1

METHOD AND APPARATUS FOR CAPTURE, ANALYSIS AND DISPLAY OF PACKET INFORMATION SENT IN AN IEEE 802.11 WIRELESS NETWORK

RELATED APPLICATION

This Application is related to Ser. No. 09/875,544, filed Jun 6, 2001, for "Method and Apparatus For Filtering That Specifies The Types Of Frames To Be Captured And To Be Displayed For An IEEE 802.11 Wireless LAN," the teachings of which are incorporated herein to the extent that they do not conflict herewith. The related Application, and the present Application have the same Assignee.

FIELD OF THE INVENTION

The field of the present invention relates generally to wireless networks, and more specifically to methods for operating wireless analyzers for wireless networks.

BACKGROUND OF THE INVENTION

Wireless networks for allowing computer users to communicate with one another in a wireless manner are being implemented on an ever increasing basis. One example of such a network is that based upon an IEEE 802.11 Wireless LAN (Local Area Network) Topology. Also, wireless networks have been expanded for use in wide area networks, and the Internet. Through the use of cell phone technology, cell phones are now being offered with the built-in capability to permit one to access the Internet directly from the cell phone.

Wireless networks, as with any communication system, can develop defects interfering with error communication between users, and even preventing communication between the wireless network users. Accordingly, it is necessary to provide tools for analyzing defects that occur at any given time in a wireless network. Fortunately, an international standard has been agreed upon in relation to information technology associated with telecommunications and information exchange between systems, including local and metropolitan area networks. The international standard is ISO/IEC 8802-11, and better known for LANs under ANSI./IEEE Standard 802.11. The provisions of this standard are incorporated herein by reference, to the extent they do not conflict herewith.

Various tools have been developed for permitting troubleshooters to analyze traffic or communications over a wireless network. For example, Networks Associates Technology, Inc., Santa Clara, Calif., has developed an analyzer known as "Sniffer® Wireless". The present inventors recognized that analyzers such as the Sniffer® Wireless can be improved by providing the capability to visually inspect vital statistical data associated with the wireless network, such as wireless LAN IEEE 802.11 Topology. They recognized that if the data is processed in a logical manner for presentation on a display, analyzers providing this function will permit troubleshooters to recognize and correct communication problems occurring in the wireless network. Also, through use of such displays in an analyzer, a troubleshooter will be able to more readily eliminate excessive overlap, and better recognize areas in the network that are not presently covered by access points (AP).

SUMMARY OF THE INVENTION

The present invention provides a method for programming an analyzer for a wireless network, such as a Sniffer® Wireless to capture information for each frame received via packets captured from a wireless network for the purpose of accumulating statistical information relative to the wireless network being analyzed. Means are provided for analyzing the frame data contents, and collecting other information obtained by the associated hardware in capturing or receiving data frames traveling in the Wireless Network. The invention includes programming means for arranging the statistical information into a logical presentation for display.

BRIEF DESCRIPTION OF THE DRAWINGS

Various embodiments of the present invention are described herein with reference to the drawings, in which like items are identified by the same reference designation, wherein.

The acronyms used herein are well known to those of ordinary skill. For example, WEP, PLCP, NAI, BSSID, and ESSID stand for: wired equivalent privacy, physical layer convergence protocol, Network Associates, Inc., basic service set identification, and extended service set identification, respectively.

DETAILED DESCRIPTION OF THE INVENTION

Figure 1:
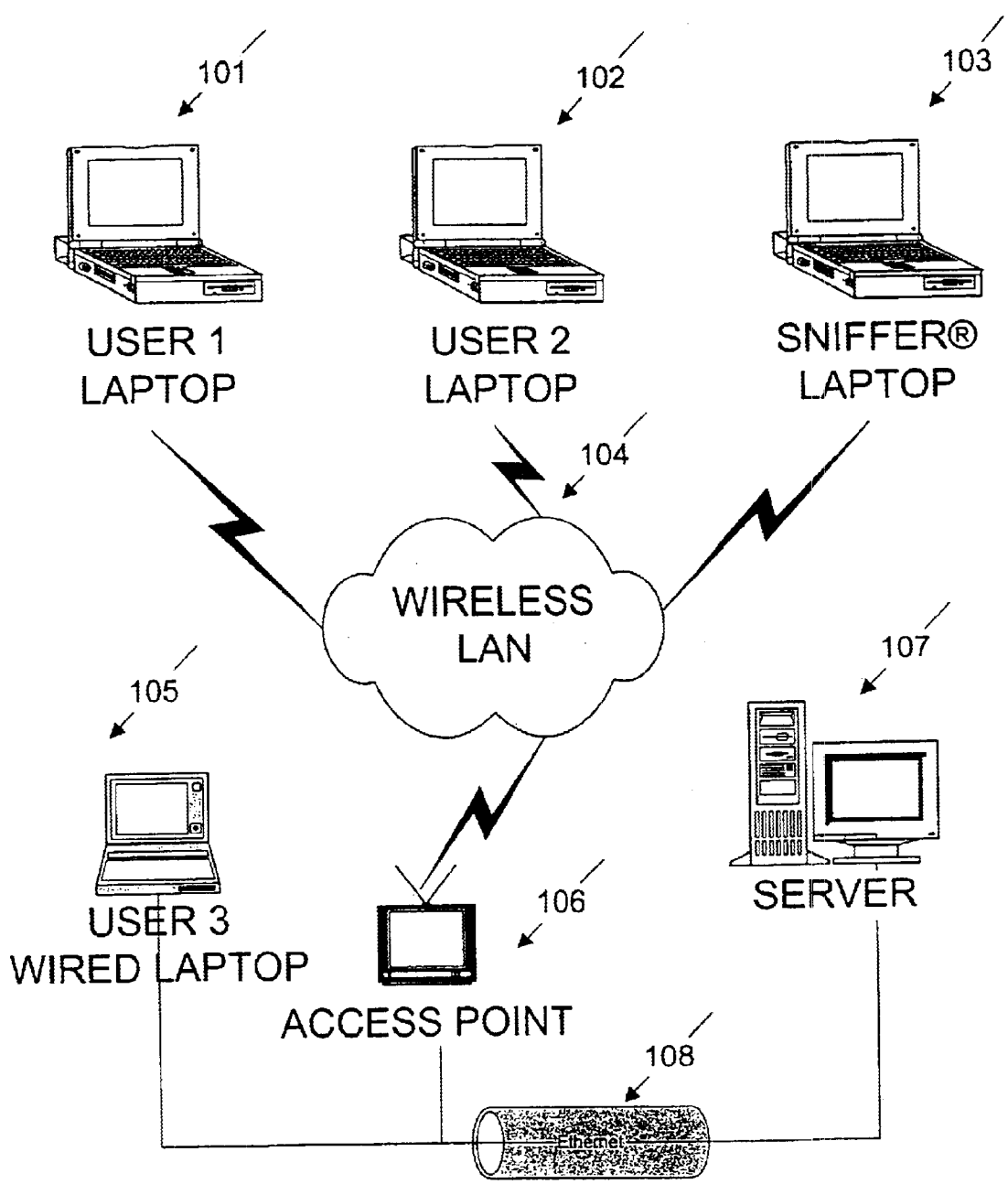
FIG. 1 shows a block schematic diagram of a computer network comprising a wire line network, such as Ethernet, in communication with a wireless LAN.

With reference to FIG. 1, a known configuration of a LAN-based wireless communication network 104 is shown. The network 104 permits a plurality of wireless stations or computer users 101, and 102, and a wireless local bridge or access point 106 connected to a wire line network 108 (Ethernet in this example) to communicate with one another. The network 104 also permits a Sniffer® Wireless laptop computer 103 to be connected thereto. Accordingly, in this example, the users of the laptop computers 101 through 103 can communicate in a wireless and portable manner with the wired stations, such as the laptop 105, and server 107, wired to the access point 106, in this example, and/or desktop computers, main frames, and various other network communication equipment devices to be connected for communication in the manner shown. Note that as would be known to one of skill in the art, the known system can also be used for permitting other than laptop computers, such as desktop computers, and main frames, to be connected for communication in the manner shown. The access point 106 can be provided by a wireless network interface device, such as for example, a Cisco Aironet Series 340 or Series 350 Wireless LAN, Cisco Systems, San Jose, Calif., or by Symbol Technologies Spectrum 24 High Rate Adapter LA-4121-1020US, or other such devices. Such devices transmit digital signals from the wireless stations, such as 101 through 103, in this example, to the wireless medium 104, for providing the efficient transfer of information between a sending station and a receiving station, typically in the form of digitally modulated RF carrier signals. The access point 106 enables communication between the wireless network stations 101 and 102, in this example, and the wired network stations 105 and 107, in this example, thereby expanding the communication capability of the associated LAN. Information, control signals and other forms of digital data can be transmitted between the various stations in the LAN in the form of discrete data frames. The data frames, as one skilled in the art would recognize, are provided in a specific format commonly used in the transmission of data over the LAN, in this example.

The present invention is described for use with networks formatted in accordance with IEEE Specification for 802.11 and 802.11b networks. The following Table 1 shows how the aforesaid standard defines specific frame types, the subtypes under each frame type, and the IEEE Specification location for each frame subtype.

TABLE 1

| Frame Type | Frame Sub Type | IEEE Specification Location |
|---|---|---|
| CONTROL | ACK | [1] IEEE 7.2.1.3 |
|  | CTS | [1] IEEE 7.2.1.2 |
|  | RTS | [1] IEEE 7.2.1.1 |
|  | PS-POLL | [1] IEEE 7.2.1.4 |
|  | CF-END | [1] IEEE 7.2.1.5 |
|  | CF-END/CF-ACK | [1] IEEE 7.2.1.6 |
| MANAGEMENT | ASSOCIATION REQUEST | [1] IEEE 7.2.3.4 |
|  | ASSOCIATION RESPONSE | [1] IEEE 7.2.3.5 |
|  | REASSOCIATION REQUEST | [1] IEEE 7.2.3.6 |
|  | REASSOCIATION RESPONSE | [1] IEEE 7.2.3.7 |
|  | PROBE REQUEST | [1] IEEE 7.2.3.8 |
|  | PROBE RESPONSE | [1] IEEE 7.2.3.9 |
|  | BEACON | [1] IEEE 7.2.3.1 |
|  | ATIM | [1] IEEE 7.2.3.2 |
|  | DISASSOCIATION | [1] IEEE 7.2.3.3 |
|  | AUTHENTICATION | [1] IEEE 7.2.3.10 |
|  | DEAUTHENTICATION | [1] IEEE 7.2.3.11 |
| DATA | DATA | [1] IEEE 7.2.2 |

The IEEE Specifications for 802.11 and 802.11b define specific frame attributes for frames transmitted on a given network. The Sniffer® Wireless is designed to receive the data associated with the frame attributes, and classify the same. The "Frame Attributes", and their description, and LOCATION relative to the IEEE Specification, are shown below in Table 2, as follows:

TABLE 2

| Frame Attribute | Description | IEEE Specification |
|---|---|---|
| (FIRST PORTION) | | |
| Retry | The 802.11 MAC Header contains a bit in the Frame Control Field indicating that the current frame was retransmitted by the transmitter due to a failure to receive an acknowledgment from the receiving station. | [1] 7.1.3.1.6 |
| WEP | The 802.11 MAC Header contains a bit in the Frame Control Field indicating that the current frame data field is encrypted using WEP encryption. | [1] 7.1.3.1.9 |
| Order | The 802.11 MAC Header contain a bit in the Frame Control Field indicating that the current frame belongs in the strictly ordered class. | [1] 7.1.3.1.10 |

TABLE 2-continued

| Frame Attribute | Description | IEEE Specification |
|---|---|---|
| Short PLCP | The 802.11 Specification indicates that a preamble field shall be transmitted prior to transmitting packet data. This preamble/PLCP contains a specific pattern useful for receiver synchronization. The 802.11b Specification offers the option that stations can transmit a shorter preamble/PLCP header. The duration of this shorter preamble/PLCP header occupies 96 microseconds of link.<br>(SECOND PORTION) | [2] 18.2.2.2 |
| Long PLCP | The 802.11 Specification indicates that a preamble field shall be transmitted prior to transmitting packet data. This preamble/PLCP contains a specific pattern useful for receiver synchronization. The original 802.11 Specification indicates that the duration of the Long PLCP/preamble occupies 192 microseconds of link. | [2] 18.2.2.1 |
| 1 Mbps | The 802.11 Specification indicates that the PLCP Header of a frame defines the speed at which the data field is transmitted. Under certain RF environment conditions, the transmitter will select which speed to transmit each packet. The available speeds for transmitting the data field of a packet are 1, 2, 5.5 and 11 Mbps. | [2] 18.2.3.3 |
| 2 Mbps | The 802.11 Specification indicates that the PLCP Header of a frame defines the speed at which the data field is transmitted. Under certain RF environment conditions, the transmitter will select which speed to transmit each packet. The available speeds for transmitting the data field of a packet are 1, 2, 5.5 and 11 Mbps. | [2] 18.2.3.3 |
| 5.5 Mbps | The 802.11 Specification indicates that the PLCP Header of a frame defines the speed at which the data field is transmitted. Under certain RF environment conditions, the transmitter will select which speed to transmit each packet. The available speeds for transmitting the data field of a packet are 1, 2, 5.5 and 11 Mbps.<br>(THIRD PORTION) | [2] 18.2.3.3 |
| 11 Mbps | The 802.11 Specification indicates that the PLCP Header of a frame defines the speed at which the data field is transmitted. Under certain RF environment conditions, the transmitter will select which speed to transmit each packet. The available speeds for transmitting the data field of a packet are 1, 2, 5.5 and 11 Mbps. | [2] 18.2.3.3 |
| CRC Error | The 802.11 Specification indicates that the data field of a 802.11 frame will use a 32 bit Frame Check Sequence field that performs an integrity check on the data field to detect that a receiver has received a frame free of errors. | [1] 7.1.3.6 |
| PLCP Error | The 802.11 Specification indicates that the PLCPO field of an 802.11 frame will use a 16 bit Frame Check Sequence field that performs an integrity check on the 4 Byte PLCP header to insure that a receiver has received a PLCP header free of errors. | [2] 18.2.3.6 |
| WEP ICV Error | The 802.11 Specification indicates that when WEP Encryption is used, an Integrity Check Value on the Encrypted data frame be used to insure the integrity of the encrypted payload of that WEP frame. | [1] 8.2.5 |
| PLCP Length Field | The 802.11 Specification indicates within the PLCP header the total number of microseconds for which the 802.11 MPDU occupies the link. | [2] 18.2.3.5 |

The present invention programs a wireless network analyzer, such as Sniffer® Wireless (a product of Networks Associates Technology, Inc., Santa Clara, Calif. 95054), for example, to process the data or information relative to each frame that is captured or received, for the purpose of accumulating statistical information relative to the wireless network that is being analyzed. The frame data contents are analyzed to provide the statistical information. Other information may also be provided by the hardware or analyzer device received in the data frames. The following Table 2 also provides a description of statistical information items derived from the contents of each frame, provides a description of each item, source of the item, and a flowchart of the variable names associated with the item.

With further reference to FIG. 1, the Sniffer® Wireless Laptop 103 is designed to monitor all data, control and management frames transmitted on or over the Wireless LAN 104 between all stations or computer devices 101, 102, 105, and 107, and any other combination of computers communicating over the Wireless LAN 104.

Figure 2:
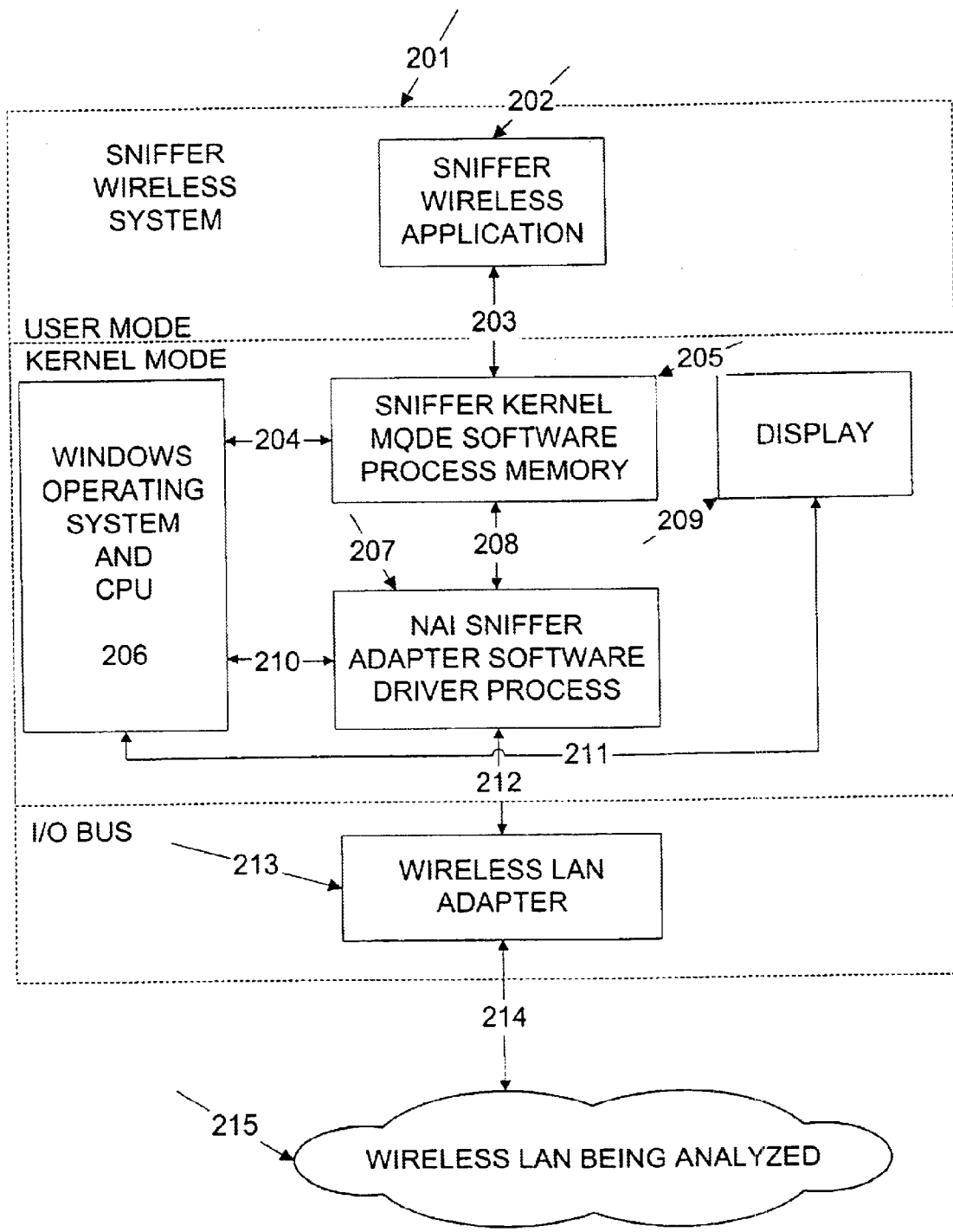
FIG. 2 shows a block schematic diagram of a Sniffer® Wireless system.

A block diagram of a Sniffer® Wireless System 201 is shown in FIG. 2. As shown, a Wireless LAN 215 that is being analyzed by the Sniffer® Wireless 201 via typically RF Signals 214 received by a Wireless LAN adapter 213. The wireless LAN adapter 213 converts the rf signals to electrical signals, and they are connected via a bus or cable 212 to a driver 207. The hard wire connection 208 connects the driver 207 to memory 205, and via another bus or wired connection 210 to a central processing unit (CPU) 206. The "Sniffer® Kernel Mode Software Process Memory" 205 is also connected via a bus or cable connection 203 to a "Sniffer® Wireless Application" 202. The CPU 206 drives a display 209 for presenting processed frame information to a user, as will be explained. Note that as shown, the "Sniffer® Wireless Application" 202 operates in a "user mode", which is a non-privileged processor mode that applications typically run in. This mode limits the set of available interfaces, and also limits access to system data. Contrary to this, the combination of the CPU 206 and "Sniffer® Kernel Mode Software Process Memory" 205, driver 207, and display 209, are operated in a "kernel mode", which is a privileged mode of code execution via CPU 206, in which the contents of memory of 205 are totally accessible, and all CPU 206 instructions are permitted to be issued. In other words, the operating system code, including system services and device drivers, are run in a kernel mode.

Figure 3:
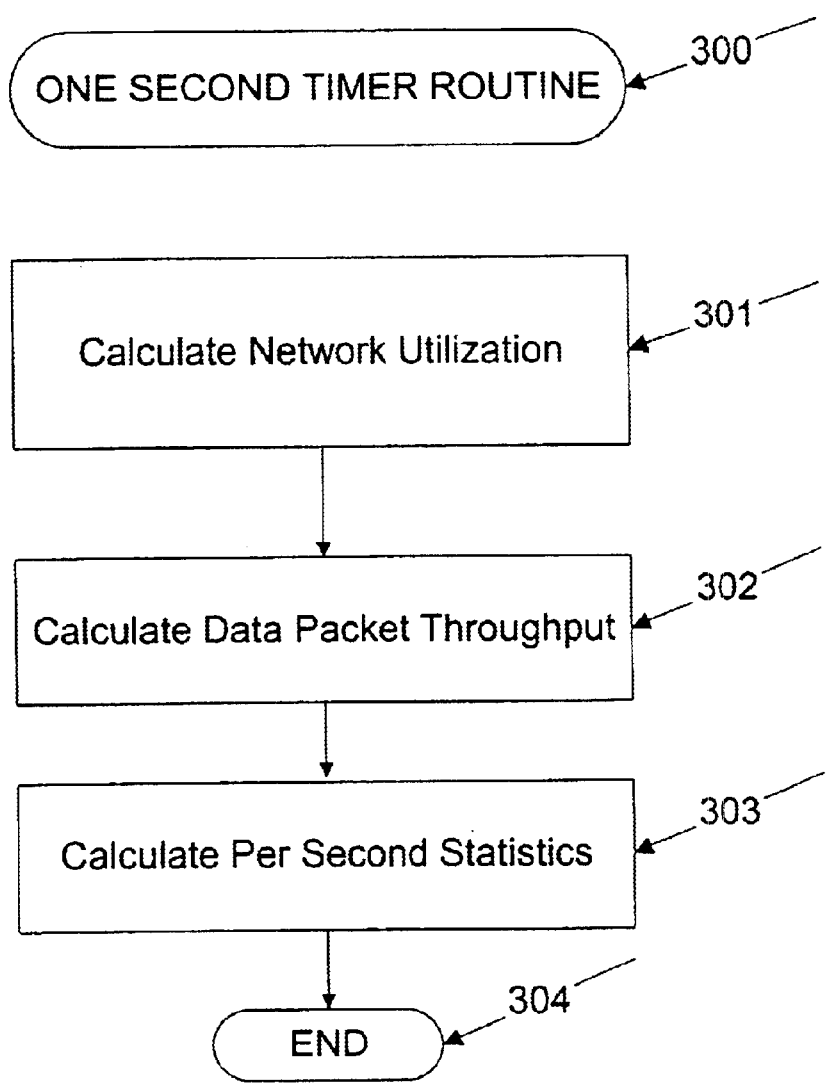
FIG. 3 shows a "One Second Timer Routine" flowchart for one embodiment of the invention.

The operation of the invention in the Sniffer® Wireless 103, in this example, will now be described. With reference to the flowchart of FIG. 3, a "one second timer routine" 300 is called by the operating system of CPU 206 when a one second time period has elapsed. In response, the timer routine executes first step 301 to Calculate Network Utilization, followed by step 302 to Calculate Data Packet Throughput, followed by step 303 to Calculate Per Second Statistics observed by the Sniffer® Wireless Analyzer 201. The per second processing is performed by the Adapter Software Driver process 207, and the Sniffer® kernel mode software process held in memory 205.

Figure 4:
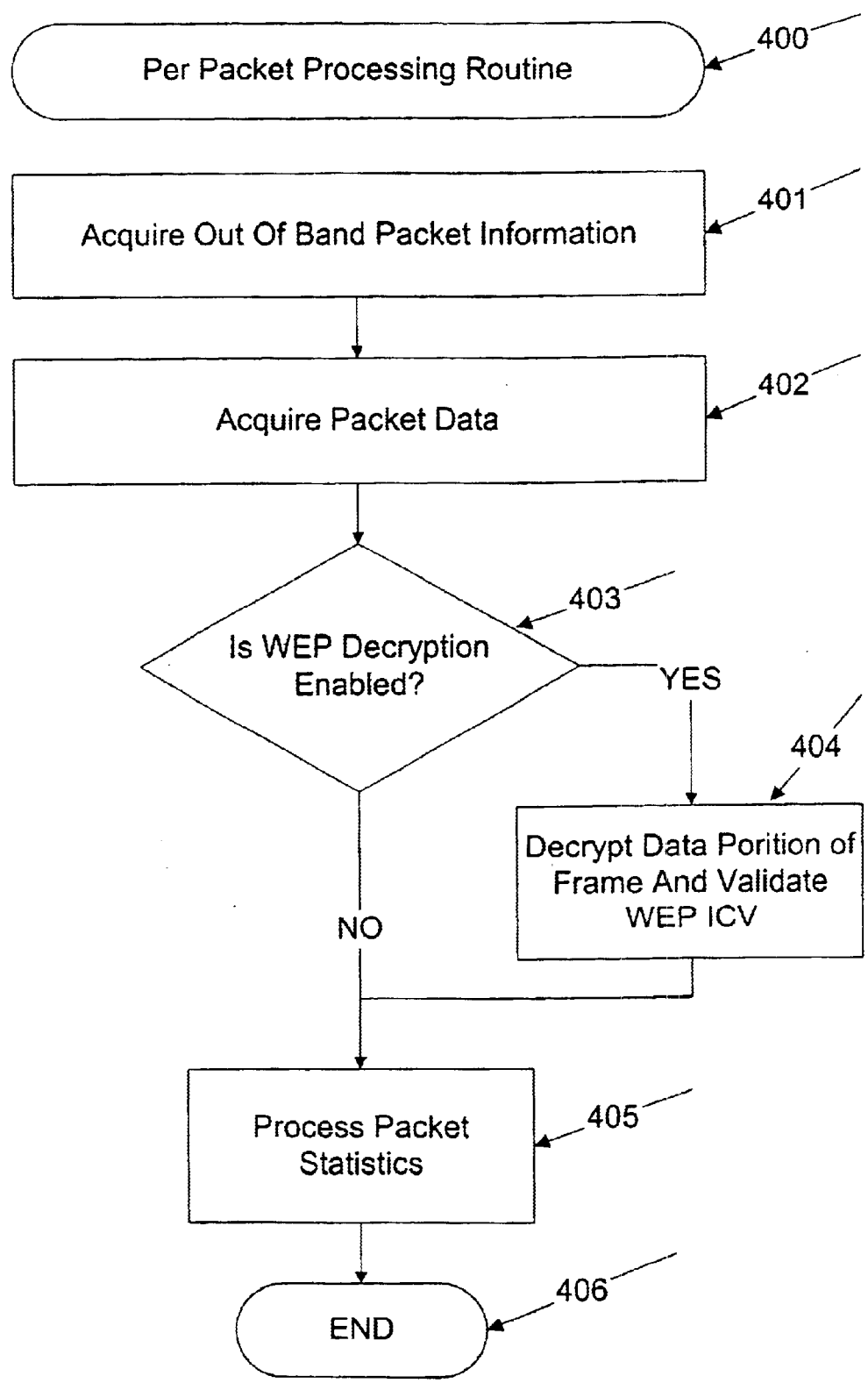
FIG. 4 shows a flowchart for a "Per-packet Processing Routine" for an embodiment of the invention.

Referring to FIG. 4, a Per Packet Processing Routine 400 is executed whenever a packet is received by the Wireless LAN Adapter 213. The NAI Sniffer Adapter Software Driver Process 207 and the Sniffer® kernel mode software process held in memory 205 perform this per packet processing. The first step is to Acquire Out Of Band Data 401. Typically, a Wireless LAN Adapter 213 will have some mechanism for acquiring data that exists which describes information about a received packet. This out of band data is used to describe conditions of the network being monitored. For example, RSSI (Received Signal Strength Indicator) is one of these conditions. The next step is to Acquire Packet Data 402. In this step, the packet data received by the Wireless LAN Adapter 213 is copied from the Wireless LAN Adapter 213 into the NAI Sniffer Adapter Software Driver Process 207 for further processing. Step 403 describes a condition where if WEP (wired equivalent privacy) Decryption is enabled, then further WEP Decryption can occur. If step 403 condition is YES, then Step 404 will Decrypt the Data Portion of the 802.11 Data Frame, and do a validation check on the WEP ICV (integrity check value). The Process Packet Statistics 405 process will accumulate the statistics observed by the Sniffer Wireless System (201).

Figure 5:
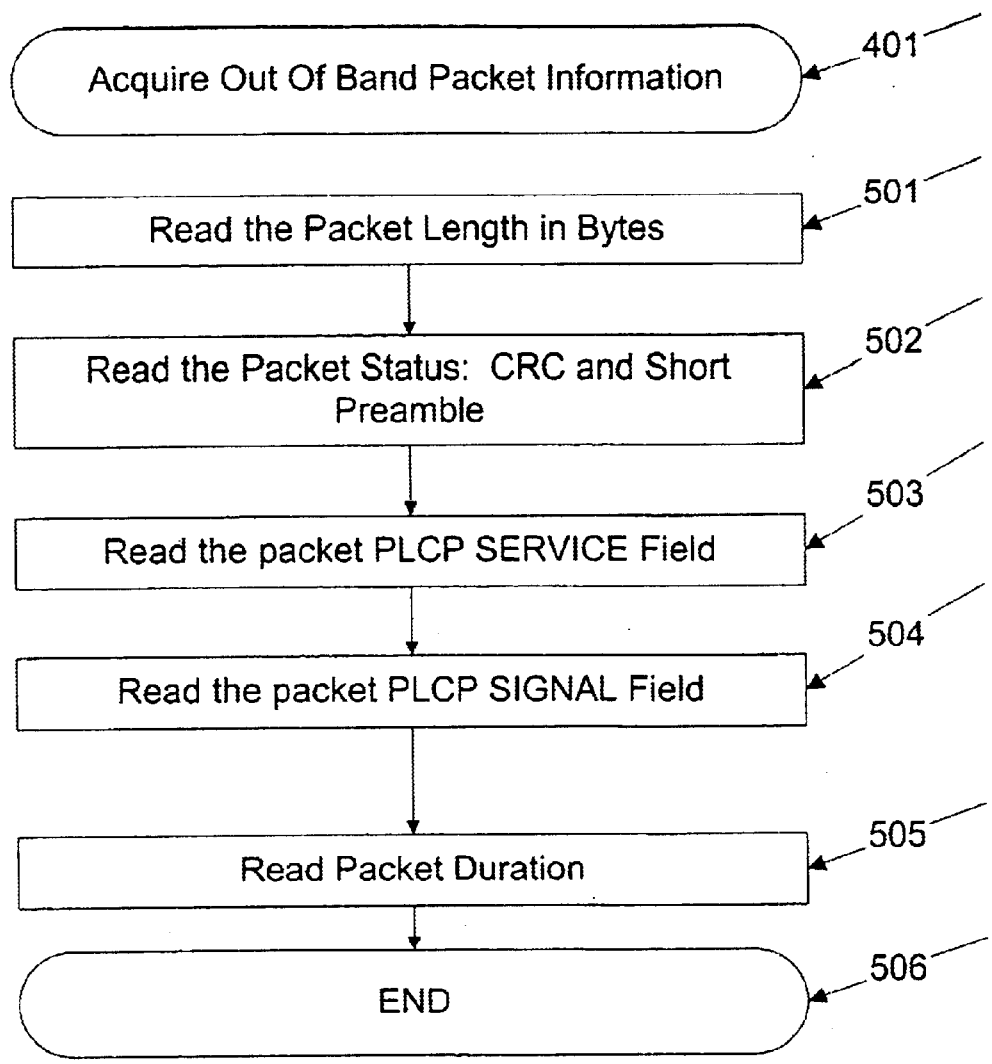
FIG. 5 shows a flowchart of the steps for a subroutine to provide the "Acquire Out of Band Data" step of FIG. 4.

Referring to FIG. 5, the program shown is a subroutine for providing Acquire Out Of Band Data step 401 for the Per Packet Processing Routine 400 (see FIG. 4). The first step 501 is to Read The Packet Length in bytes of the received packet. Next the CRC Error Status and Short Preamble Status are read from the Wireless LAN Adapter 213 in step 502. Step 503 indicates that the PLCP (physical layer convergence protocol) Header SERVICE Field shall be read from the Wireless LAN Adapter 213. Step 504 indicates that the PLCP Header SIGNAL Field shall be read from the Wireless LAN Adapter 213. Step 505 determines the current packet duration in microseconds. The subroutine terminates at 506.

Figure 6:
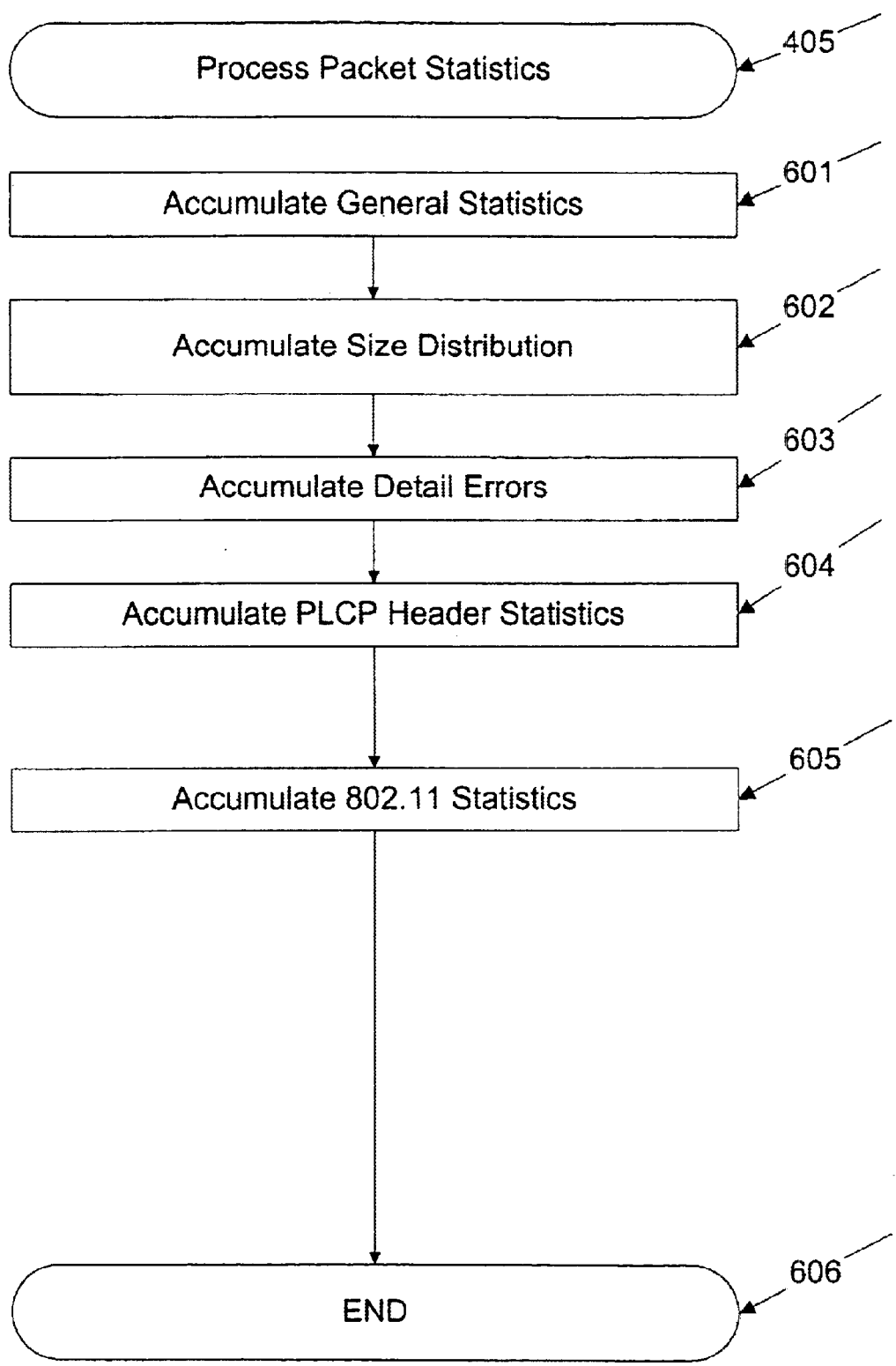
FIG. 6 is a flowchart showing the subroutine steps required for providing the "Processed Packet Statistics" step of the flowchart of FIG. 4.

Referring to FIG. 6, a subroutine is shown for providing the Process Packet Statistics step 405 (see FIG. 4). First, the Accumulate General Statistics Step 601 will accumulate statistics for Packets, Octets, Broadcast and Multicast Packet counters. The second step, Accumulate Size Distribution 602 will use the received packet length to accumulate the appropriate Size Distribution statistics observed by the Sniffer Wireless System 201. The third step, Accumulate Detail Errors 603 will accumulate error statistics for the current received packet if it has an error. The next step, Accumulate PLCP Header Statistics 604 uses the PLCP (Physical Layer Convergence Protocol) Header SIGNAL and SERVICE field to determine the 802.11 packet rate distribution (1 Mbps, 2 Mbps, 5.5 Mbps, or 11 Mbps) statistics and accumulate the SHORT PLCP and LONG PLCP header statistics. Step 605 will Accumulate 802.11 Packet data statistics.

Figure 7:
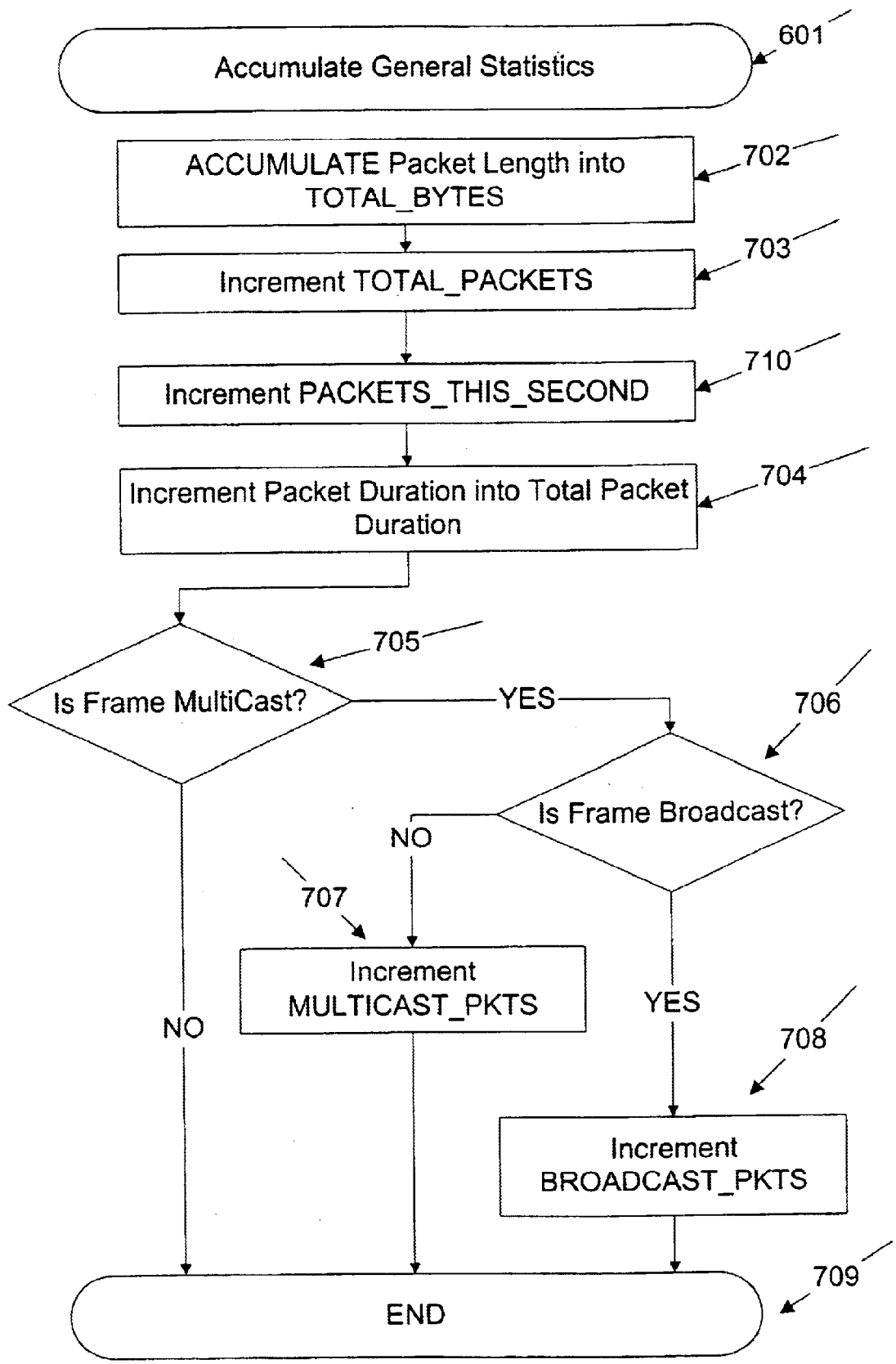
FIG. 7 is a flowchart showing a subroutine for providing the "Accumulate General Statistics" step of the flowchart of FIG. 6.

Referring to FIG. 7, a subroutine is shown for the step Accumulate General Statistics 601 (see FIG. 6). Step 702 accumulates the current packet data length into the variable TOTAL_BYTES. Step 703 increments the TOTAL_PACKETS received. Step 710 increments the PACKETS_THIS_SECOND. Step 704 accumulates the received packet microsecond duration found in step 505 (see FIG. 5) into the TOTAL_PACKET_MICROSECONDS variable. The conditional Step 705 determines if the Receiver Address as specified in ISO/IEC 8802-11 ANSI/IEEE Std. 802.11, First edition 1999-00-00, is a Multi Cast Address. If so, then conditional Step 706 determines if the Receiver Address as specified in ISO/IEC 8802-11 ANSI/IEEE Std. 802.11, First edition 1999-00-00, is a Broadcast Address. If so, then step 708 will increment the BROADCAST_PKTS variable. If not, then Step 707 will increment the MULTI-CAST_PKTS variable. The subroutine terminates or ends at Step 709.

Figure 8:
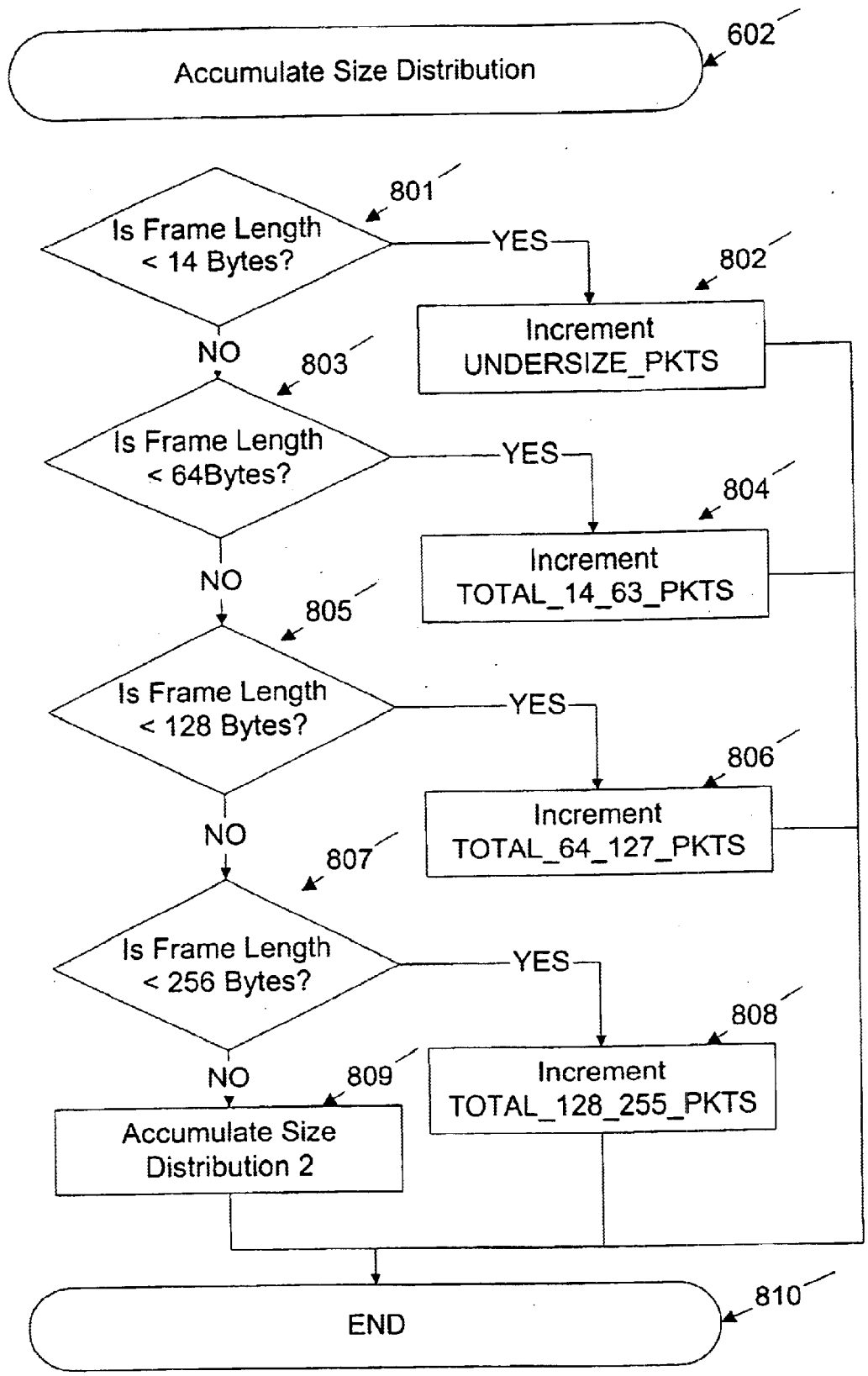
FIG. 8 is a flowchart showing a subroutine for the steps necessary to provide the "Accumulate Size Distribution" step of the flowchart of FIG. 6.

Referring to FIG. 8, a subroutine is shown for the step Accumulate Size Distribution 602 (see FIG. 6). Conditional step 801 determines if the length of the current frame is less than 14 bytes. If YES, then step 802 increments the variable UNDERSIZE_PKTS. If NO, then step 803 determines if the length of the current frame is less than 64 bytes. If YES, then step 804 increments the variable TOTAL_14_63_PKTS. If NO, then step 805 determines if the length of the current frame is less than 128 bytes. If YES, then step 806 increments the variable TOTAL_64_127_PKTS. If NO, then step 807 determines if the length of the current frame is less than 256 bytes. If YES, then step 808 increments the variable TOTAL_128_255_PKTS. If NO, then step 809 executes Accumulate Size Distribution 2. The subroutine is terminated at 810.

Figure 9:
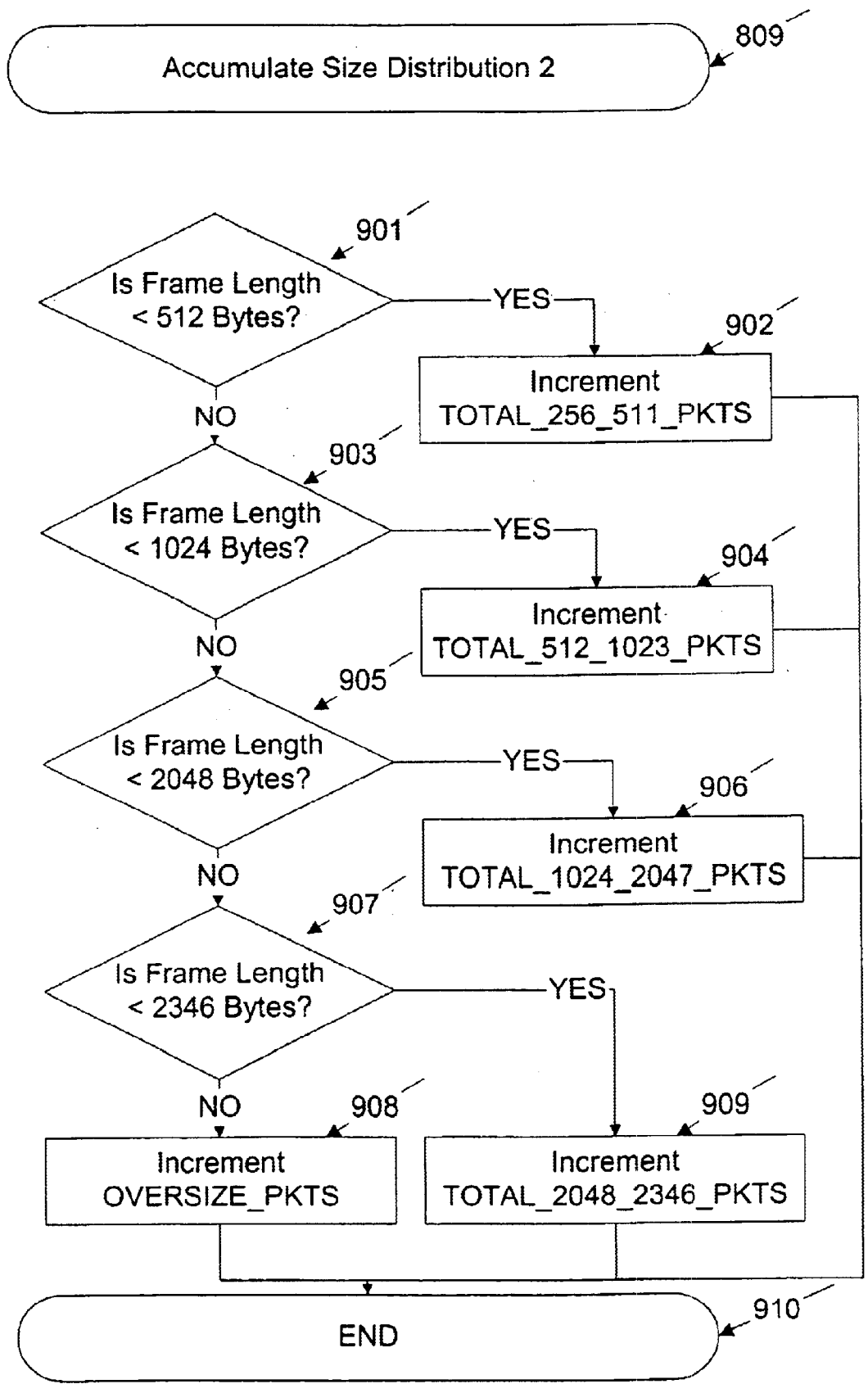
FIG. 9 is a flowchart showing a subroutine of the steps required for providing the "Accumulate Size Distribution 2" step of the flowchart of FIG. 8.

Referring to FIG. 9, a subroutine is shown for the step 809, Accumulate Size Distribution 2 (see FIG. 8). Conditional step 901 determines if the length of the current frame is less than 512 bytes. If YES, then step 902 increments the variable TOTAL_256_511_PKTS. If NO, then step 903 determines if the length of the current frame is less than 1024 bytes. If YES, then step 904 increments the variable TOTAL_512_1023_PKTS. If NO, then step 905 determines if the length of the current frame is less than 2048 bytes. If YES, then step 906 increments the variable TOTAL_1024_2047_PKTS. If NO, then step 907 determines if the length of the current frame is less than 2346 bytes. If YES, then step 909 increments the variable TOTAL_2046_2346_PKTS. If NO, then step 908 increments the variable OVERSIZE_PKTS. The subroutine terminates at 910.

Figure 10:
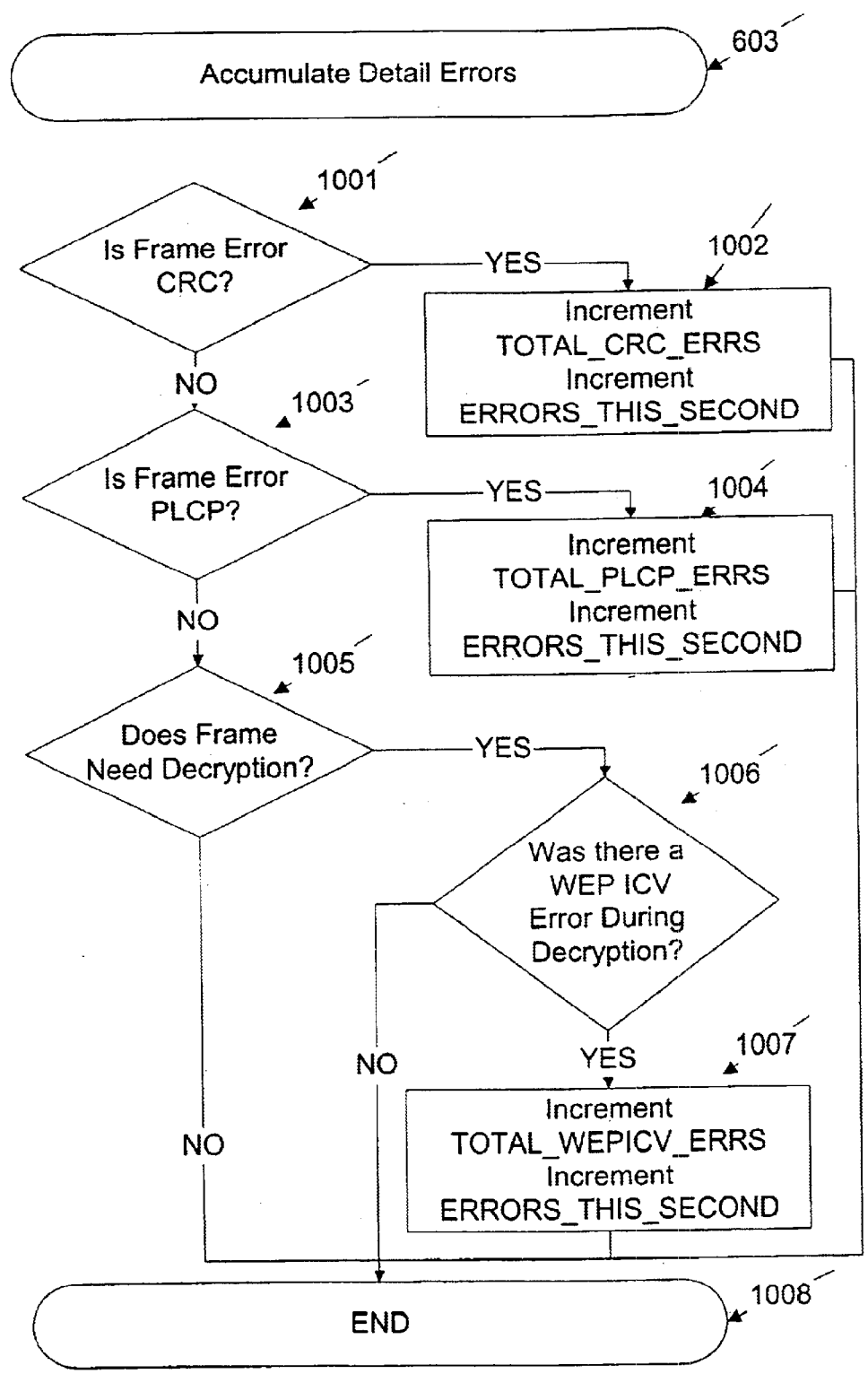
FIG. 10 is a flowchart of a subroutine for providing the "Accumulate Detail Errors" step of the flowchart of FIG. 6.

Referring to FIG. 10, a subroutine is shown for providing step 603, of Accumulate Detail Errors (see FIG. 6). Conditional step 1001 determines if the current packet received has a CRC (Cyclic Redundancy Check) error. If YES, then step 1002 will increment the variables TOTAL_CRC_ERRS, and ERRORS_THIS_SECOND. If NO, then conditional step 1003 determines if the current frame has a PLCP (physical layer convergence protocol) error. If YES, then step 1004 will increment both the variable TOTAL_PLCP_ERRS, and ERRORS_THIS_SECOND. If NO, then conditional step 1005 determines if the frame decryption occurred. If YES, then conditional step 1006 determines if there was a WEP ICV error during decryption. If YES, then step 1007 increments the variables TOTAL_WEPICV_ERRS, and ERRORS_THIS_SECOND. Subroutine 1000 terminates at 1008.

Figure 11:
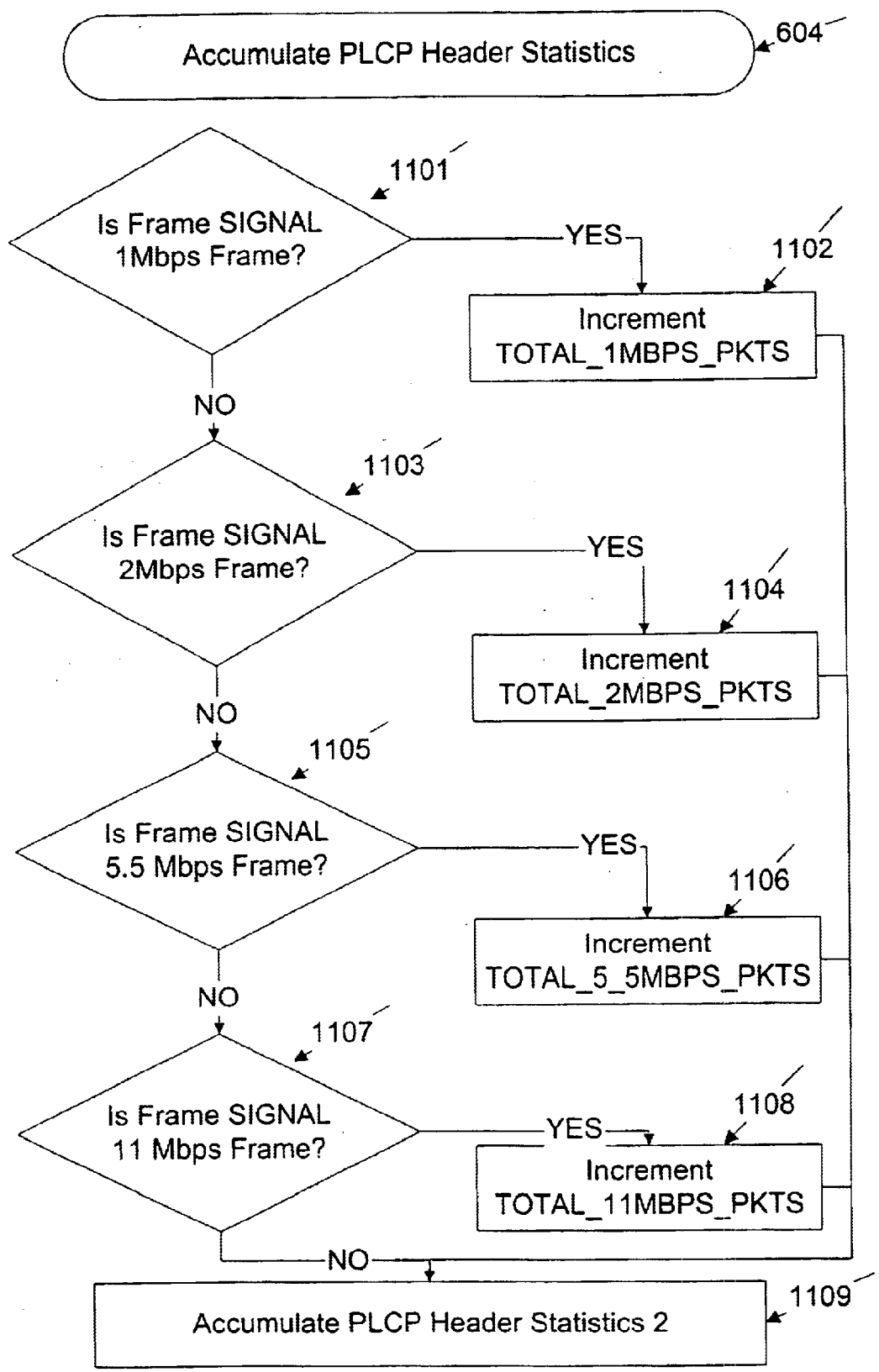
FIG. 11 is a flowchart showing a subroutine of the steps required to provide the "Accumulate PLCP Header Statistics" step of the flowchart of FIG. 6.

Referring to FIG. 11, a subroutine is shown for step 604, Accumulate PLCP Header Statistics (see FIG. 6). Conditional step 1101 determines if the current packet received PLCP Header SIGNAL field describes the frame as being transmitted at 1 Mbps Barker Code. If YES, then step 1102 increments the variable TOTAL_1 MBPS_PKTS. If NO, then conditional step 1103 determines if the current packet received PLCP Header SIGNAL field describes the frame as being transmitted at 2 Mbps Barker Code. If YES, then step 1104 increments the variable TOTAL_2 MBPS_PKTS. If NO, then conditional step 1105 determines if the current packet received PLCP Header SIGNAL field describes the frame as being transmitted at 5.5 Mbps CCK Code. If YES, then step 1106 increments the variable TOTAL_5_5 MBPS_PKTS. If NO, then conditional step 1107 determines if the current packet received PLCP Header SIGNAL field describes the frame as being transmitted at 11 Mbps CCK Code. If YES, then step 1108 increments the variable TOTAL_11 MBPS_PKTS. Step 1109 executes Accumulate PLCP Header Statistics 2.

Figure 12:
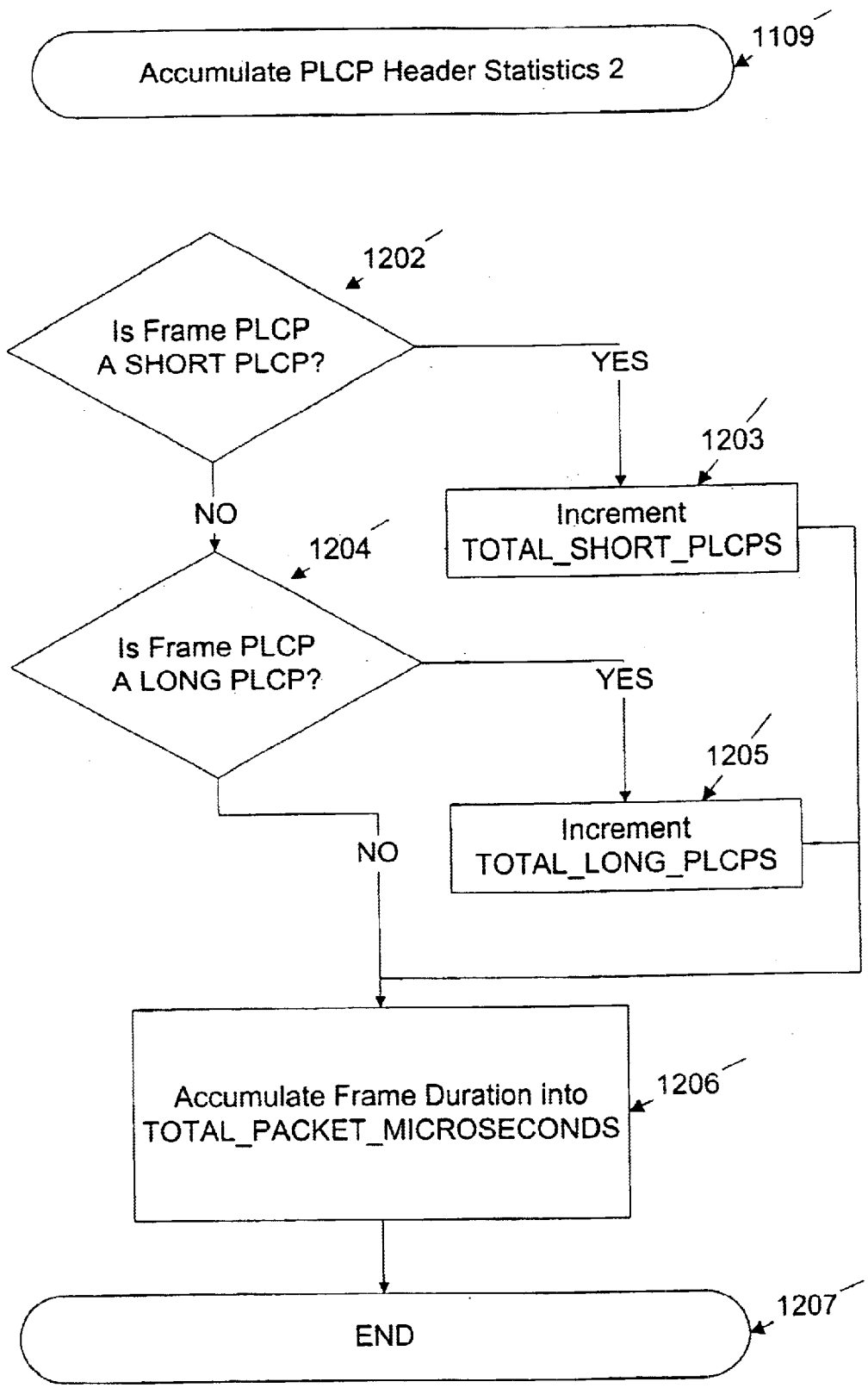
FIG. 12 is a flowchart for a subroutine showing the steps required to provide the "Accumulate PLCP Header Statistics 2" step of the flowchart of FIG. 11.

Referring to FIG. 12, a subroutine is shown for step 1109 (see FIG. 11), Accumulate PLCP Header Statistics 2. Conditional step 1202 determines if the PLCP header of the current received packet is a SHORT PLCP. If YES, then step 1203 increments the variable TOTAL_SHORT_PLCPS. If NO, then conditional step 1204 determines if the PLCP header of the current received packet is a LONG PLCP. If YES, then step 1205 increments the variable TOTAL_LONG_PLCPS. Step 1206 will accumulate the current frame microsecond duration into the variable TOTAL_PACKET_MICROSECONDS. The subroutine terminates at 1207.

Figure 13:
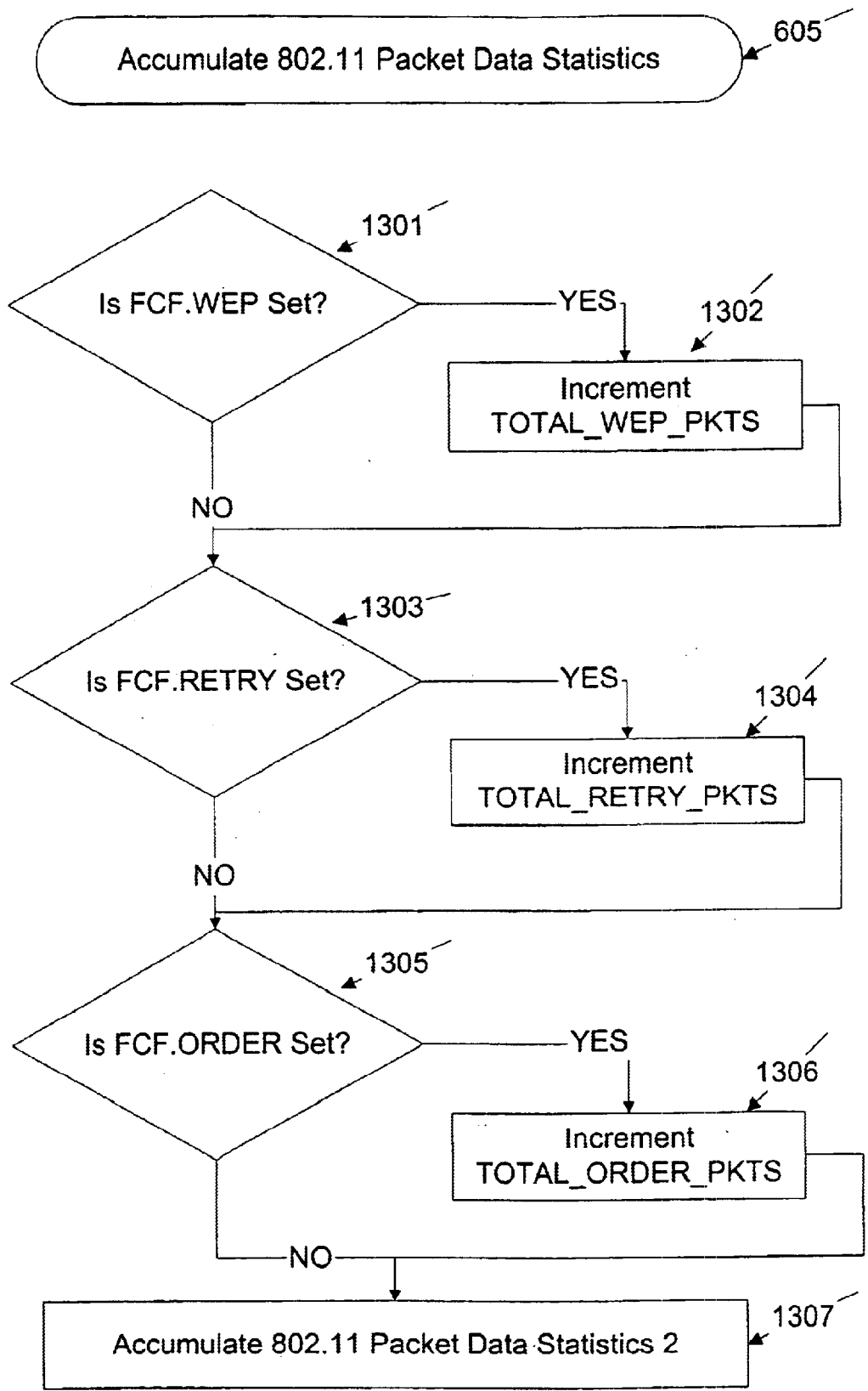
FIG. 13 is a flowchart of a subroutine for the steps required to provide the "Accumulate 802.11 Packet Data Statistics" step of the flowchart of FIG. 6.

Referring to FIG. 13, a subroutine is shown for step 605 (see FIG. 6), Accumulate 802.11 Packet Data Statistics. Conditional step 1301 determines if the WEP Privacy Bit in the 802.11 Frame Control Field is set. If YES, then step 1302 increments the variable TOTAL_WEP_PKTS. If NO, step 1303 is entered, or is entered from Step 1302. Conditional step 1303 determines if the Retry bit in the 802.11 Frame Control Field is set. If YES, then step 1304 increments the variable TOTAL_RETRY_PKTS. Conditional step 1305 determines if the Order bit in the 802.11 Frame Control Field is set. If YES, then step 1306 increments the variable TOTAL_ORDER_PKTS. Step 1307 is entered either from Step 1305 if NO, or from Step 1306, and executes Accumulate 802.11 Packet Data Statistics 2.

Figure 14:
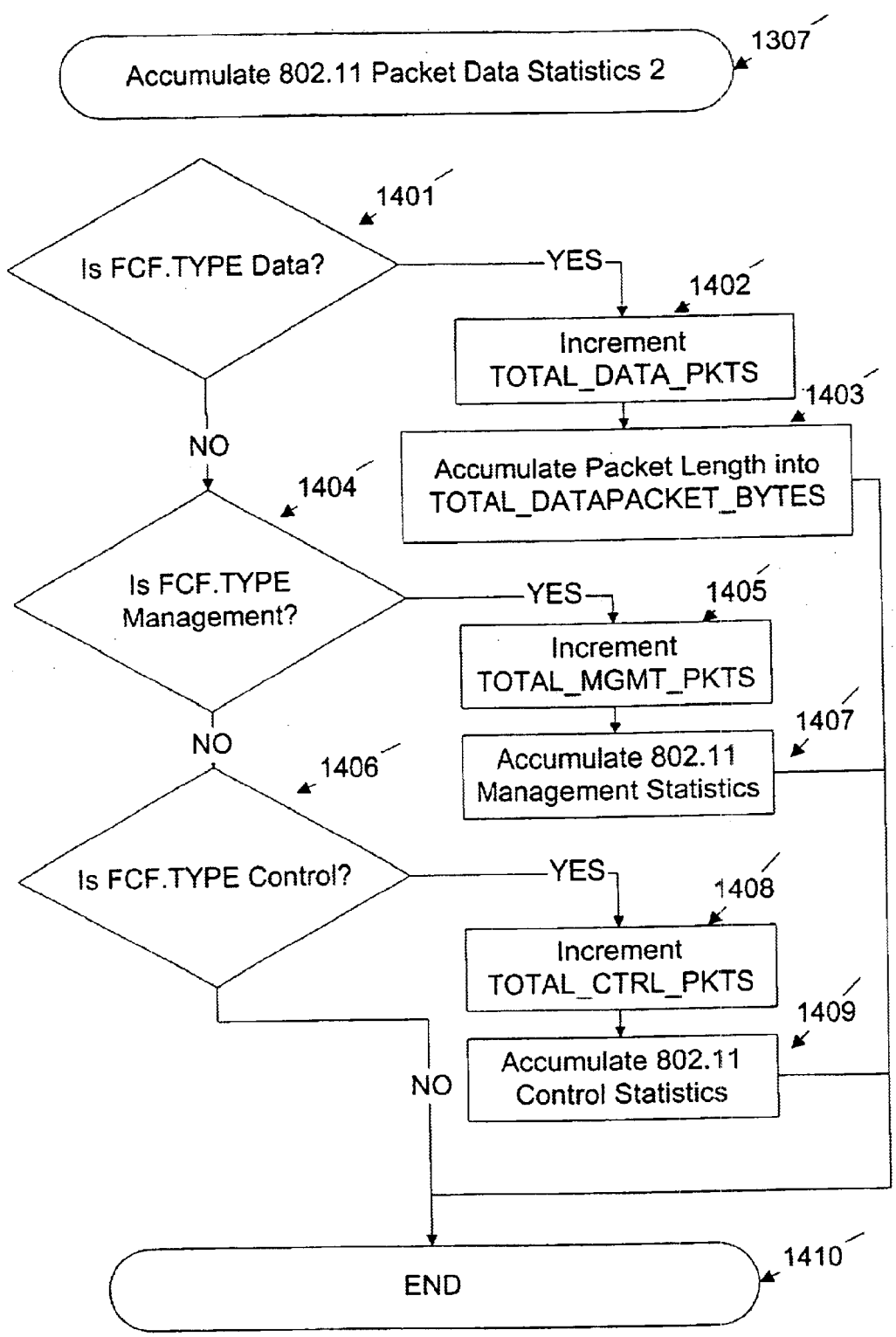
FIG. 14 is a flowchart showing a subroutine of the steps required for providing the "Accumulate 802.11 Packet Data Statistics 2" step of the flowchart of FIG. 13.

Referring to FIG. 14, a subroutine is shown for step 1307, Accumulate 802.11 Packet Data Statistics 2 (see FIG. 13). Conditional step 1401 determines if the type field of the 802.11 Frame Control Field contains the value indicating that the 802.11 frame is a data frame. If YES, then step 1402 increments the variable TOTAL_DATA_PKTS, and step 1403 accumulates the current received packet data length into TOTAL_DATAPACKET_BYTES. If NO, then conditional step 1404 determines if the type field of the 802.11 Frame Control Field contains the value indicating that the 802.11 frame is a management frame. If YES, then step 1405 increments the variable TOTAL_MGMT_PKTS, and step 1407 executes the Accumulate 802.11 Management Packet Statistics. If NO, then conditional step 1406 determines if the type field of the 802.11 Frame Control Field contains the value indicating that the 802.11 frame is a control frame. If YES, then step 1408 increments the variable TOTAL_MGMT_PKTS, and step 1409 executes the Accumulate 802.11 Control Packet Statistics. The subroutine terminates at 1410.

Figure 15:
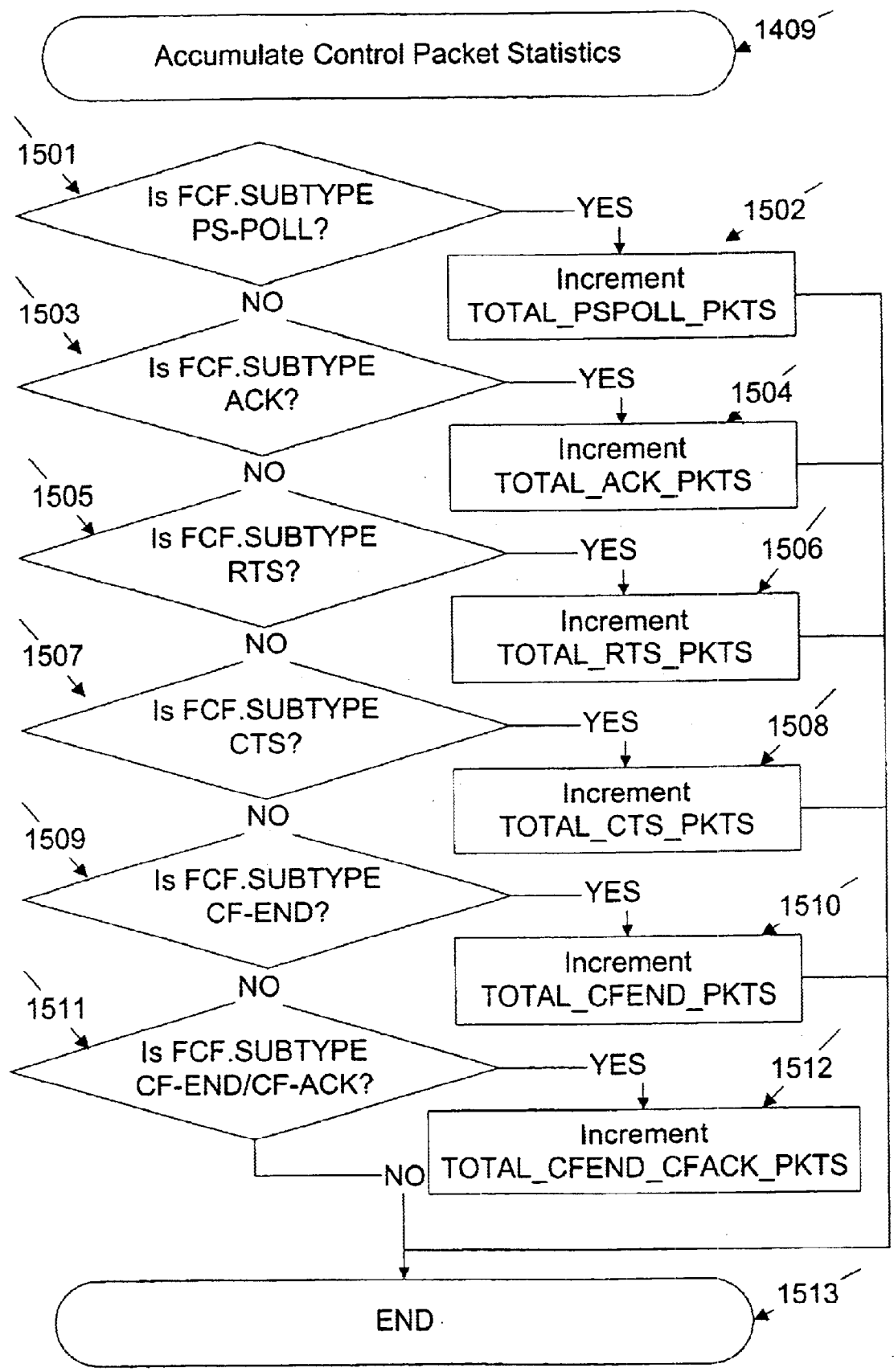
FIG. 15 is a flowchart showing a subroutine of the steps required for providing the "Accumulate 802.11 Control Statistics" step of the flowchart of FIG. 14.

Referring to FIG. 15, a subroutine is shown for Step 1409, Accumulate 802.11 Control Packet Statistics (see FIG. 14). Conditional step 1501 determines if the sub-type field of the 802.11 Frame Control Field contains the value indicating that the 802.11 control frame is a PS-POLL (power save) control frame. If YES, then step 1502 increments the variable TOTAL_PSPOLL_PKTS. If NO, then conditional step 1503 determines if the sub-type field of the 802.11 Frame Control Field contains the value indicating that the 802.11 control frame is an ACK (acknowledgment) control frame. If YES, then step 1504 increments the variable TOTAL_ACK_PKTS. If NO, then conditional step 1505 determines if the sub-type field of the 802.11 Frame Control Field contains the value indicating that the 802.11 control frame is an RTS (request to send) control frame. If YES, then step 1506 increments the variable TOTAL_RTS_PKTS. If NO, then conditional step 1507 determines if the sub-type field of the 802.11 Frame Control Field contains the value indicating that the 802.11 control frame is a CTS (clear to send) control frame. If YES, then step 1508 increments the variable TOTAL_CTS_PKTS. If NO, then conditional step 1509 determines if the sub-type field of the 802.11 Frame Control Field contains the value indicating that the 802.11 control frame is a CF-END (contention free end) control frame. If YES, then step 1510 increments the variable TOTAL_CFEND_PKTS. If NO, then conditional step 15011 determines if the sub-type field of the 802.11 Frame Control Field contains the value indicating that the 802.11 control frame is a CF-END/CF-ACK control frame. If YES, then step 1512 increments the variable TOTAL_CFEND_CFACK_PKTS. The subroutine terminates at 1513.

Figure 16:
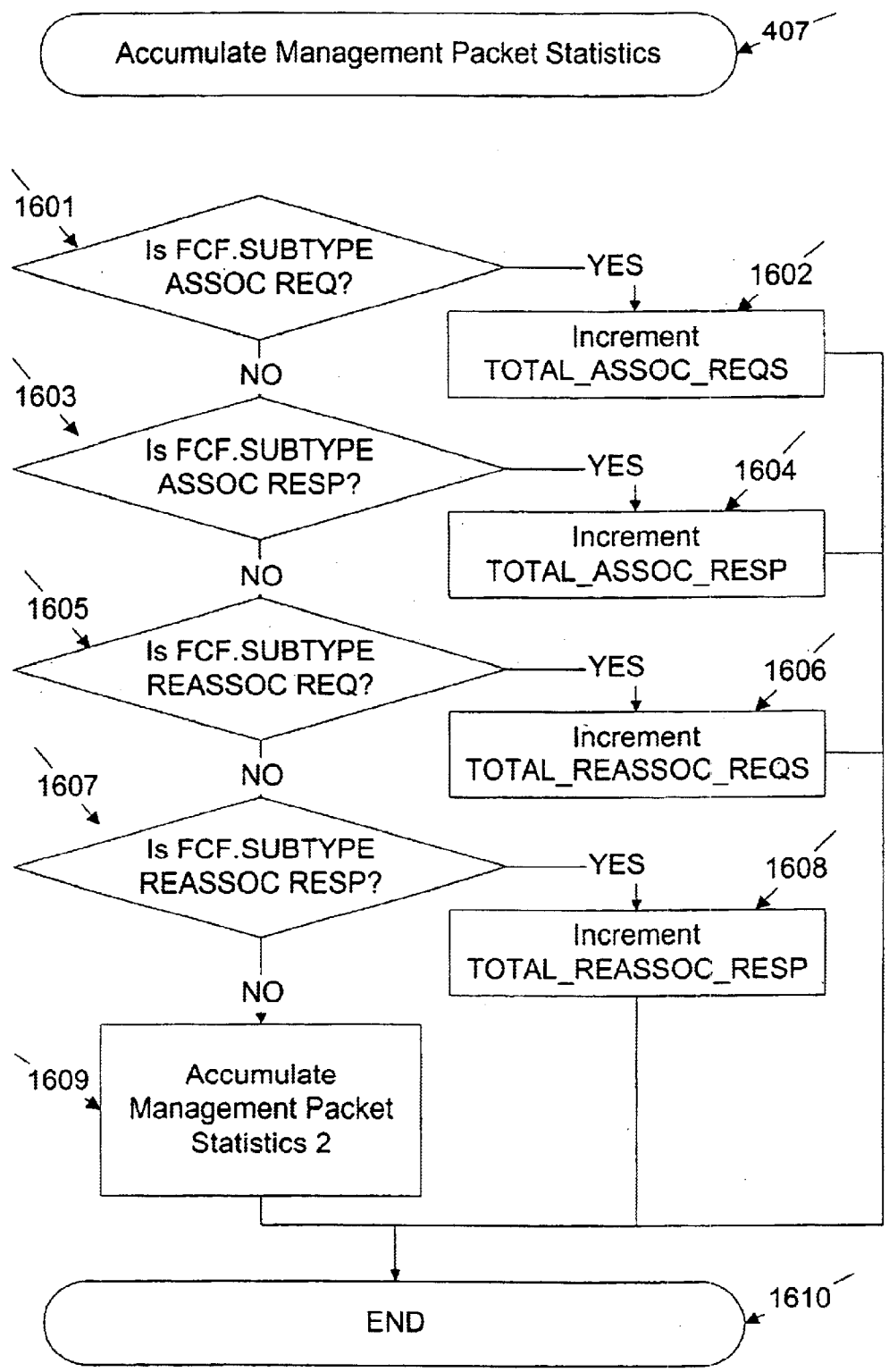
FIG. 16 shows a flowchart of a subroutine of the steps required for providing the "Accumulate 802.11 Management Packet Statistics" step of FIG. 14.

Referring to FIG. 16, a subroutine is shown for Step 1407, Accumulate 802.11 Management Packet Statistics (see FIG. 14). Conditional step 1601 determines if the sub-type field of the 802.11 Frame Control Field contains the value indicating that the 802.11 management frame is an ASSOCIATION REQUEST management frame. If YES, then step 1602 increments the variable TOTAL_ASSOC_REQS. If NO, then conditional step 1603 determines if the sub-type field of the 802.11 Frame Control Field contains the value indicating that the 802.11 management frame is an ASSOCIATION RESPONSE management frame. If YES, then step 1604 increments the variable TOTAL_ASSOC_RESP. If NO, then conditional step 1605 determines if the sub-type field of the 802.11 Frame Control Field contains the value indicating that the 802.11 management frame is a REASSOCIATION REQUEST management frame. If YES, then step 1606 increments the variable TOTAL_REASSOC_REQS. If NO, then conditional step 1607 determines if the sub-type field of the 802.11 Frame Control Field contains the value indicating that the 802.11 management frame is an REASSOCIATION RESPONSE management frame. If YES, then step 1608 increments the variable TOTAL_REASSOC_RESP. If NO, then step 1609 executes Accumulate Management Packet Statistics 2. The subroutine terminates at 1610.

Figure 17:
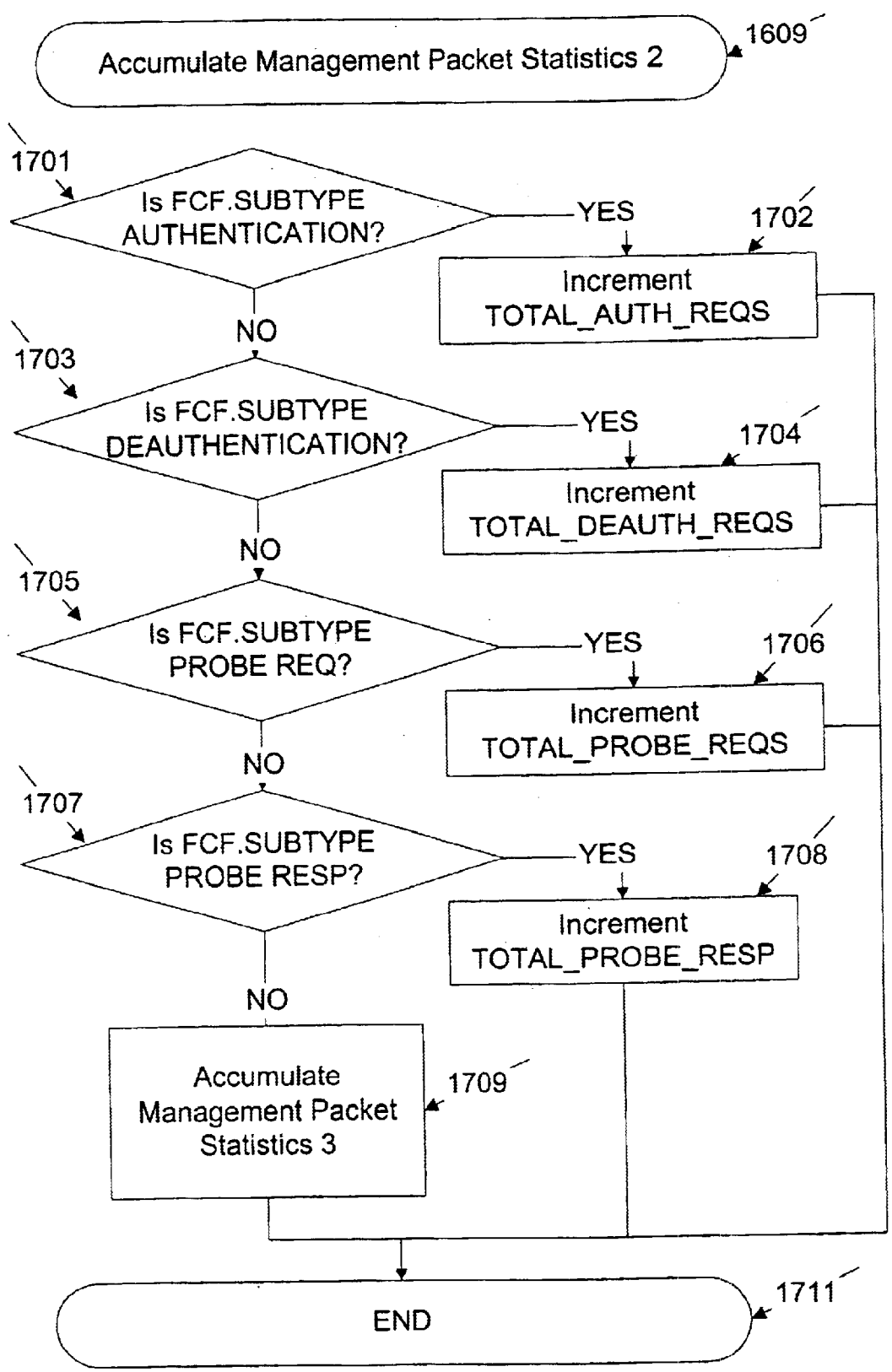
FIG. 17 shows a flowchart of a subroutine for the steps required for providing the "Accumulate 802.11 Management Packet Statistics 2" step of the flowchart of FIG. 16.

Referring to FIG. 17, a subroutine is shown for step 1609, Accumulate 802.11 Management Packet Statistics 2 (see FIG. 16). Conditional step 1701 determines if the sub-type field of the 802.11 Frame Control Field contains the value indicating that the 802.11 management frame is an AUTHENTICATION management frame. If YES, then step 1702 increments the variable TOTAL_AUTH_REQS. If NO, then conditional step 1703 determines if the sub-type field of the 802.11 Frame Control Field contains the value indicating that the 802.11 management frame is a DEAUTHENTICATION management frame. If YES, then step 1704 increments the variable TOTAL_DEAUTH_REQS. If NO, then conditional step 1705 determines if the sub-type field of the 802.11 Frame Control Field contains the value indicating that the 802.11 management frame is a PROBE REQUEST management frame. If YES, then step 1706 increments the variable TOTAL_PROBE_REQS. If NO, then conditional step 1707 determines if the sub-type field of the 802.11 Frame Control Field contains the value indicating that the 802.11 management frame is a PROBE RESP management frame. If YES, then step 1708 increments the variable TOTAL_PROBE_RESP. If NO, then step 1709 executes Accumulate Management Packet Statistics 3. The subroutine is terminated at 1711.

Figure 18:
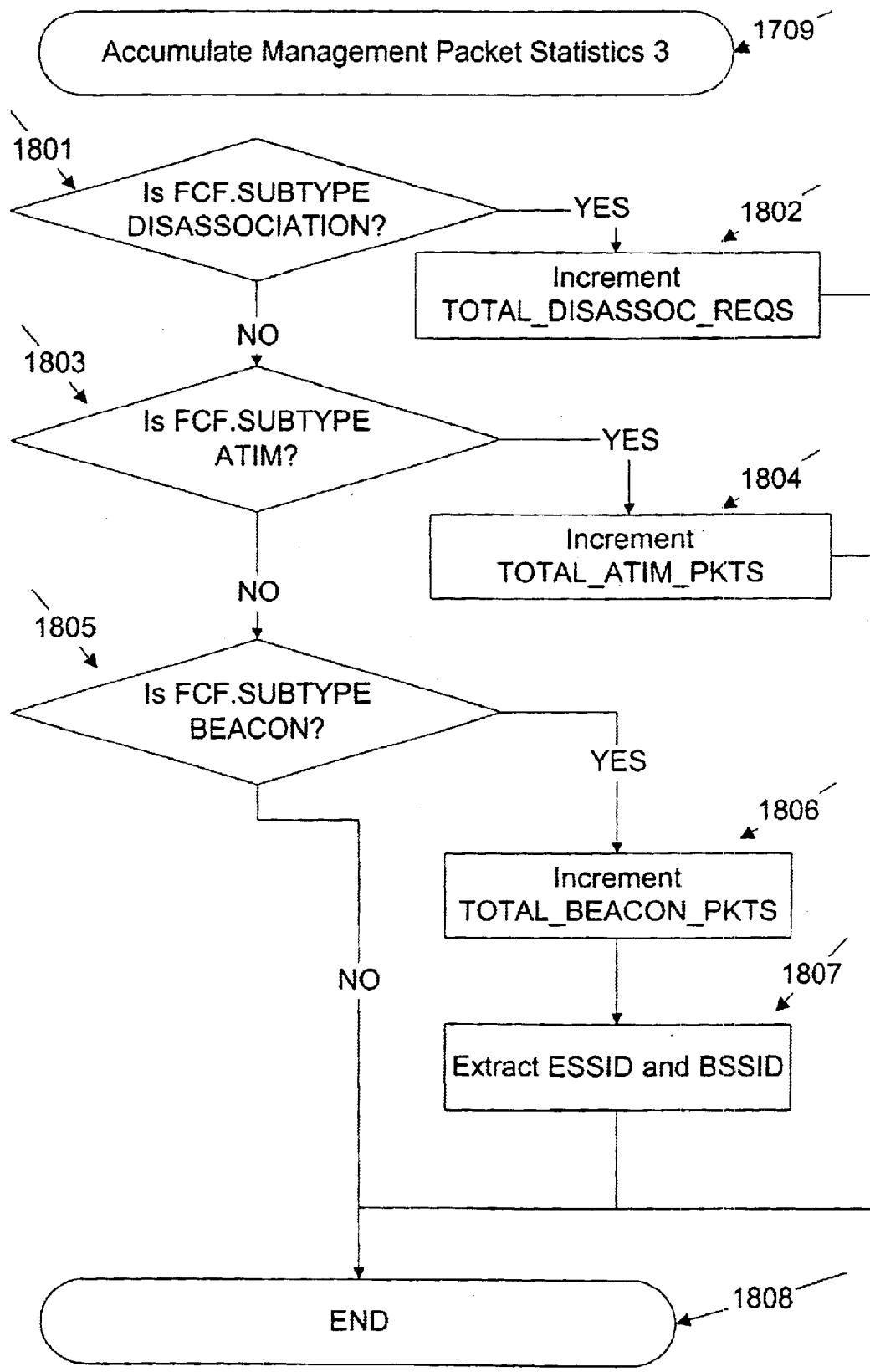
FIG. 18 is a flowchart of a subroutine showing the steps required for providing the "Accumulate Management Packet Statistics 3" step of the flowchart of FIG. 17.

Referring to FIG. 18, a subroutine is shown for step 1709, Accumulate Management Packet Statistics 3 (see FIG. 17). Conditional step 1801 determines if the sub-type field of the 802.11 Frame Control Field contains the value indicating that the 802.11 management frame is a DISASSOCIATION management frame. If YES, then step 1802 increments the variable TOTAL_DISASSOC_REQS. If NO, then conditional step 1803 determines if the sub-type field of the 802.11 Frame Control Field contains the value indicating that the 802.11 management frame is an ATIM (announcement traffic indication message) management frame. If YES, then step 1804 increments the variable TOTAL_ATIM_PKTS. If NO, then conditional step 1805 determines if the sub-type field of the 802.11 Frame Control Field contains the value indicating that the 802.11 management frame is a BEACON management frame. If YES, then step 1806 increments the variable TOTAL_BEACON_PKTS, and step 1807 follows to extract the BSSID and ESSID from the data field of the Beacon frame. The subroutine terminates at 1808.

Figure 19:
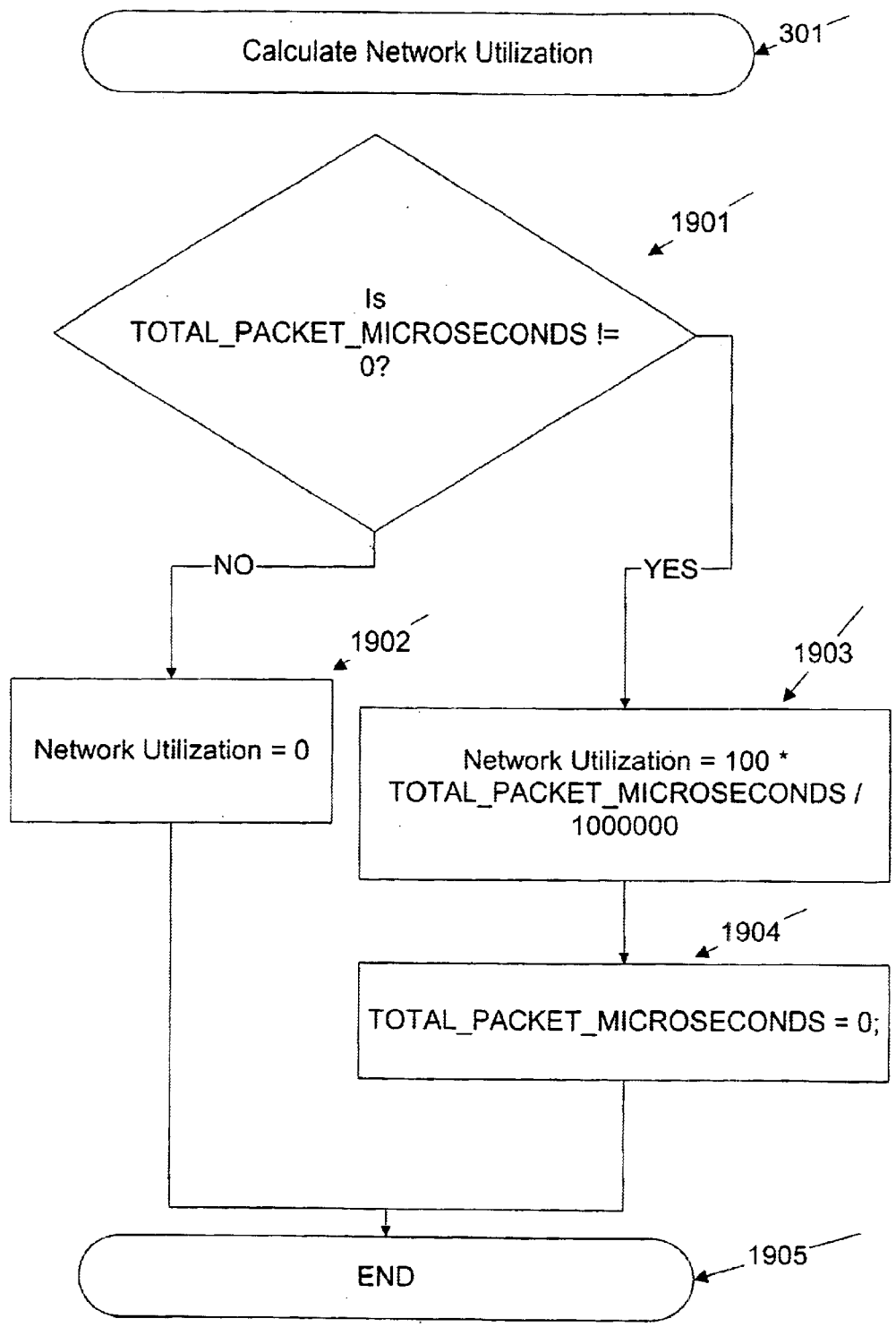
FIG. 19 is a flowchart showing a subroutine of the steps required to provide the "Calculate Network Utilization" step of the flowchart of FIG. 3.

Referring to FIG. 19, a subroutine is shown for step 301 (see FIG. 3), Calculate Network Utilization. Conditional Step 1901 determines if the variable TOTAL_PACKET_MICROSECONDS is non-zero indicating that some packets were received in the previous second. If YES, then step 1903 will calculate the previous 1 second network utilization by dividing the TOTAL_PACKET_MICROSECONDS by 1,000,000 and then converting the result to percentage by multiplying by 100. Step 1904 resets the TOTAL_PACKET_MICROSECONDS to 0 for the next 1 second calculation. If the result of step 1901 is NO, then the network utilization is set to 0 via Step 1902. The subroutine is terminated at 1905.

Figure 20:
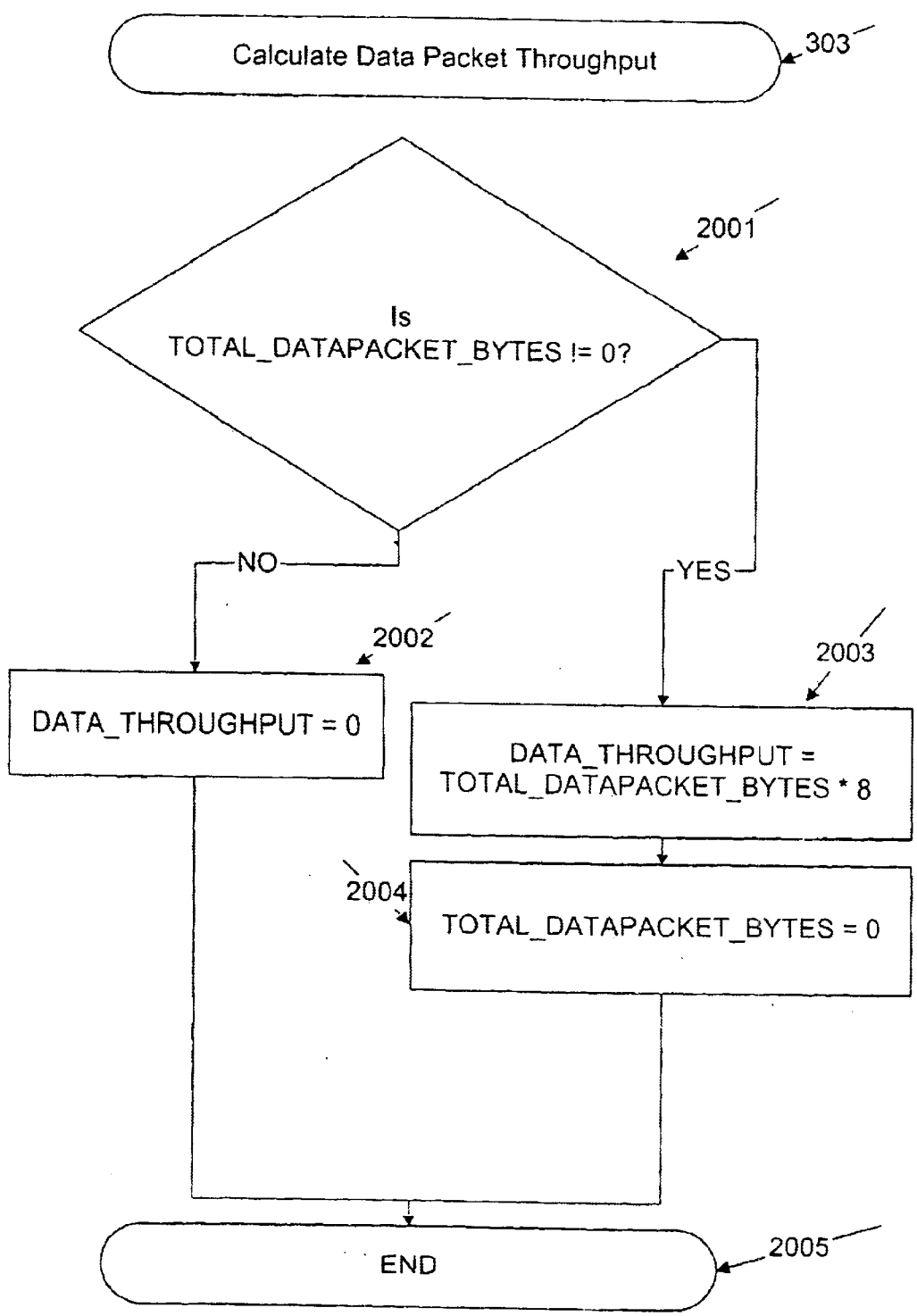
FIG. 20 is a flowchart showing a subroutine of the steps required for providing the "Calculate Data Throughput" step of the flowchart of FIG. 3.

Referring to FIG. 20, a subroutine is shown for Step 303 (see FIG. 3), Calculate Data Packet Throughput. Conditional Step 2001 determines if the variable TOTAL_DATAPACKET_BYTES is non-zero indicating that some of the received packets were 802.11 Data Packets in the 802.11 Frame Control Field type field. If YES, then step 2003 will calculate the previous 1 second Data Throughput by multiplying the total number of bytes by 8 to get the total number of bits transmitted in the previous second. Step 2004 resets the TOTAL_DATAPACKET_BYTES to 0 for the next 1 second calculation. If the result of step 2001 is NO, then the Data Throughput is set to 0 via Step 2002.

Figure 21:
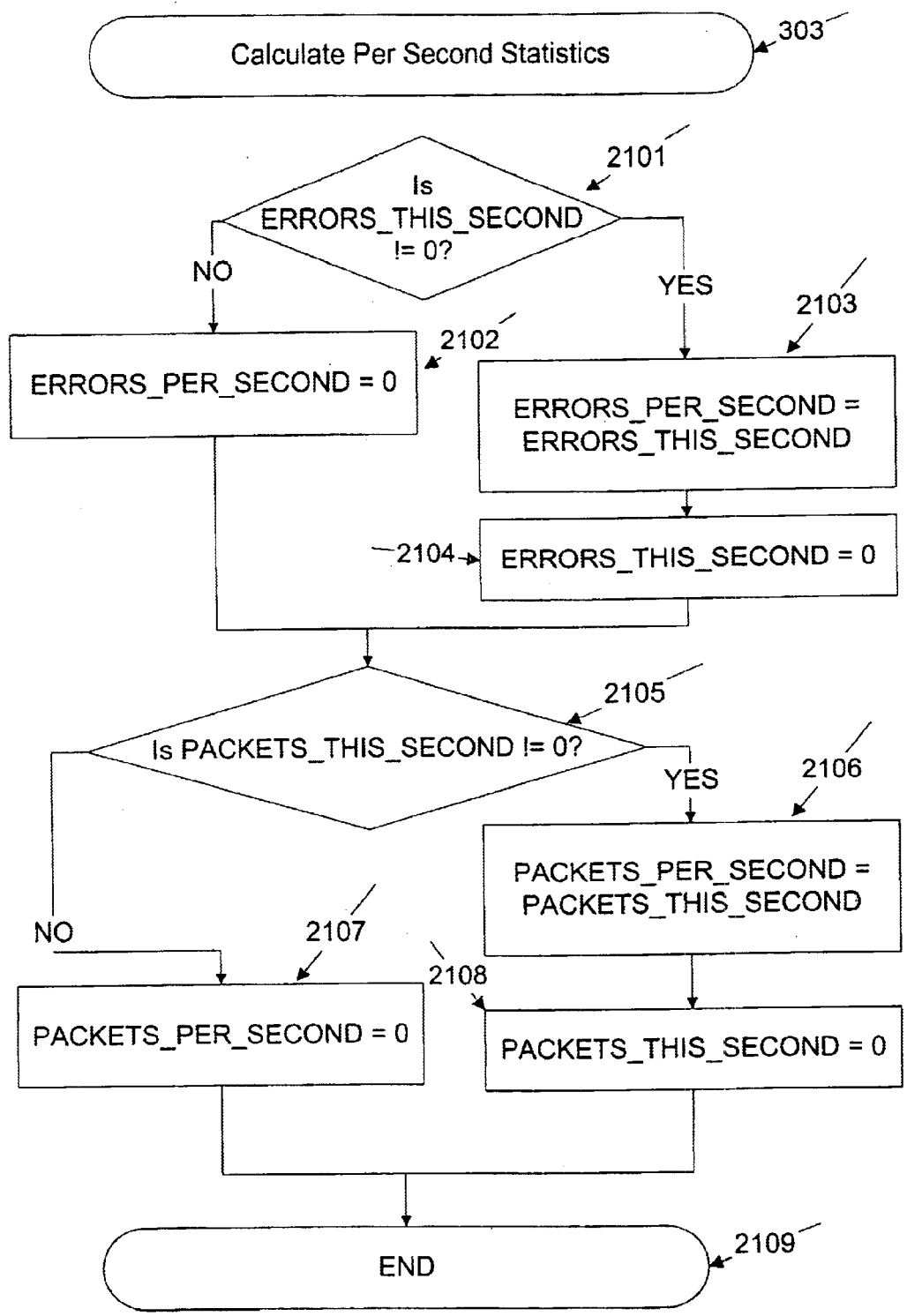
FIG. 21 is a flowchart showing a subroutine of the steps required for providing the "Calculate Per Second Statistics" step of FIG. 3.

Referring to FIG. 21, a subroutine is shown for Step 303 (see FIG. 3), Calculate Per Second Statistics. Conditional Step 2101 determines if the variable ERRORS_THIS_SECOND is unequal to zero. If YES, then step 2103 sets the last second ERRORS_PER_SECOND value to the ERRORS_THIS_SECOND variable. Step 2104 follows to reset the ERRORS_THIS_SECOND variable to zero. If the result of conditional step 2101 is NO, then the step 2102 sets ERRORS_PER_SECOND to zero. Conditional step 2105 determines if the variable PACKET_THIS_SECOND is non-zero. If YES, then step 2106 sets the variable PACKETS_PER_SECOND equal to the variable PACKETS_THIS_SECOND. Step 2108 follows to reset the variable PACKETS_THIS_SECOND to zero. If the result of conditional step 2105 is NO, then step 2107 sets ERRORS_PER_SECOND to zero.

Figure 22:
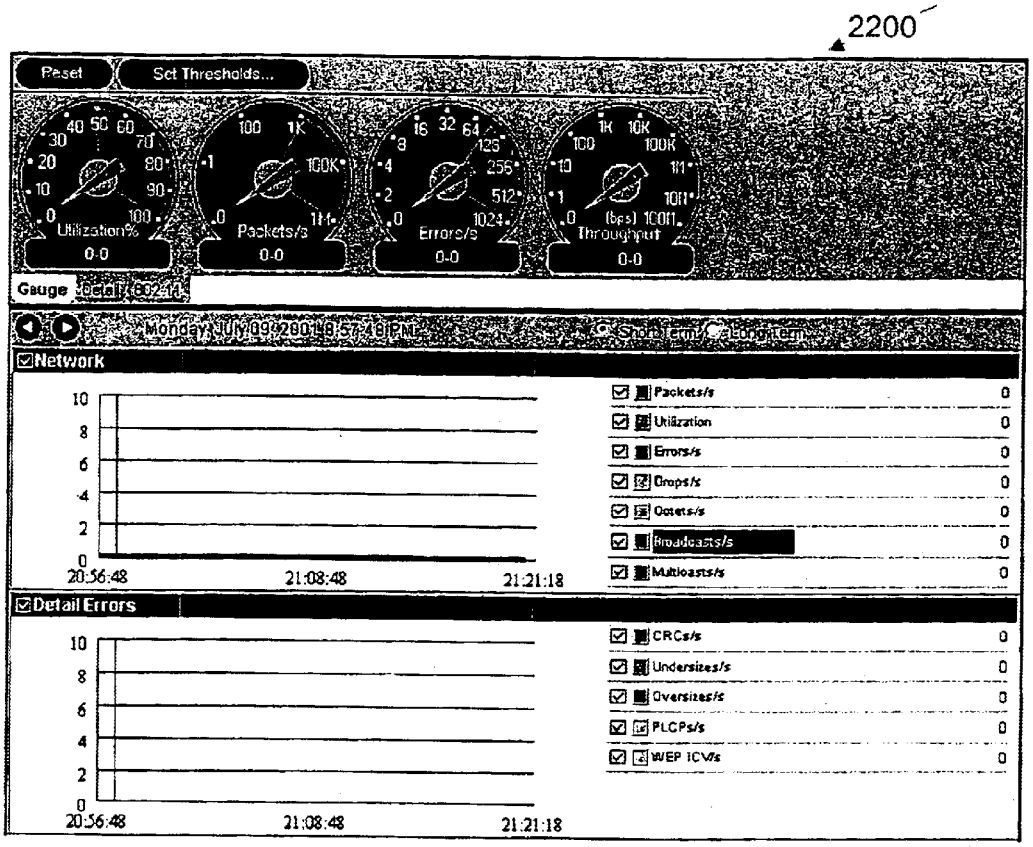
FIG. 22 shows a screen dump or display of the Sniffer® Wireless Dashboard Statistics Display, for an embodiment of the invention.
Figure 23:
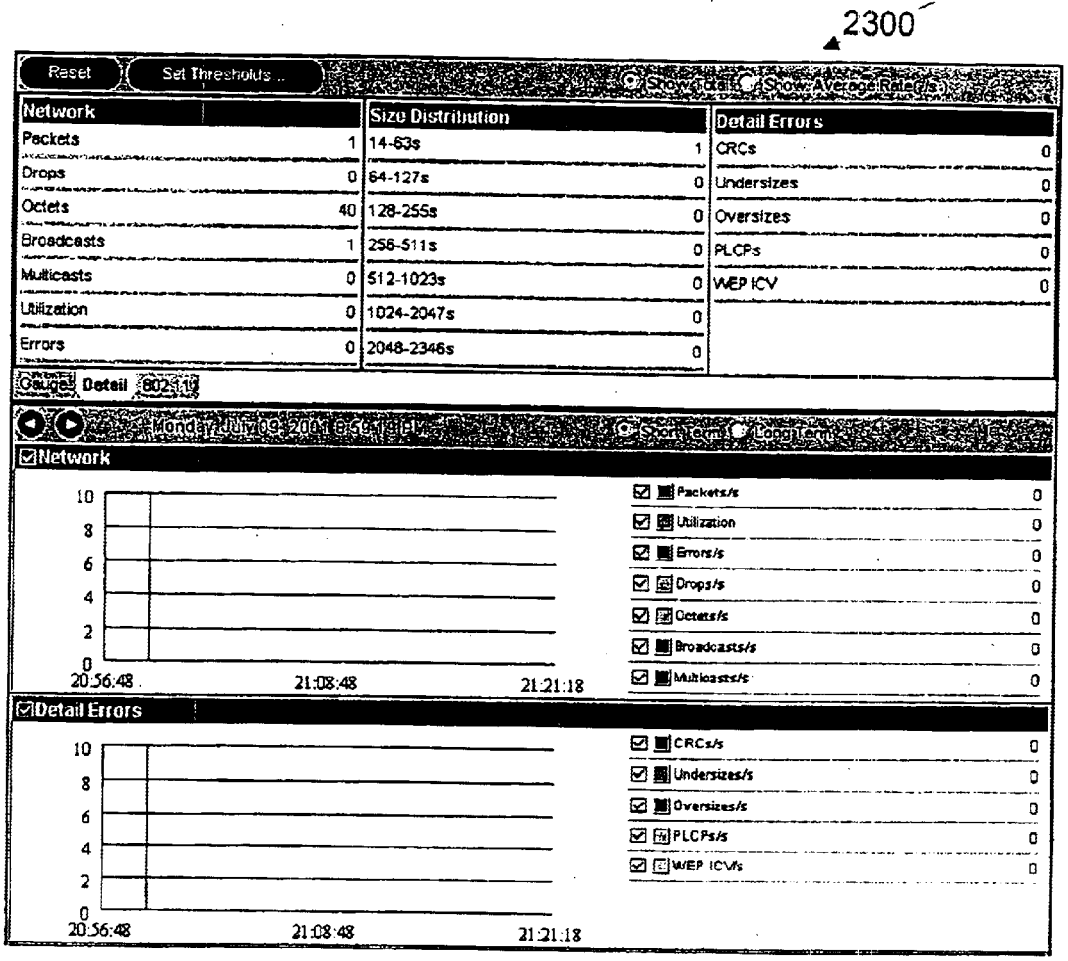
FIG. 23 shows another screen dump or display of the "User Interface of the Sniffer® Wireless Dashboard Statistics Display"
Figure 24:
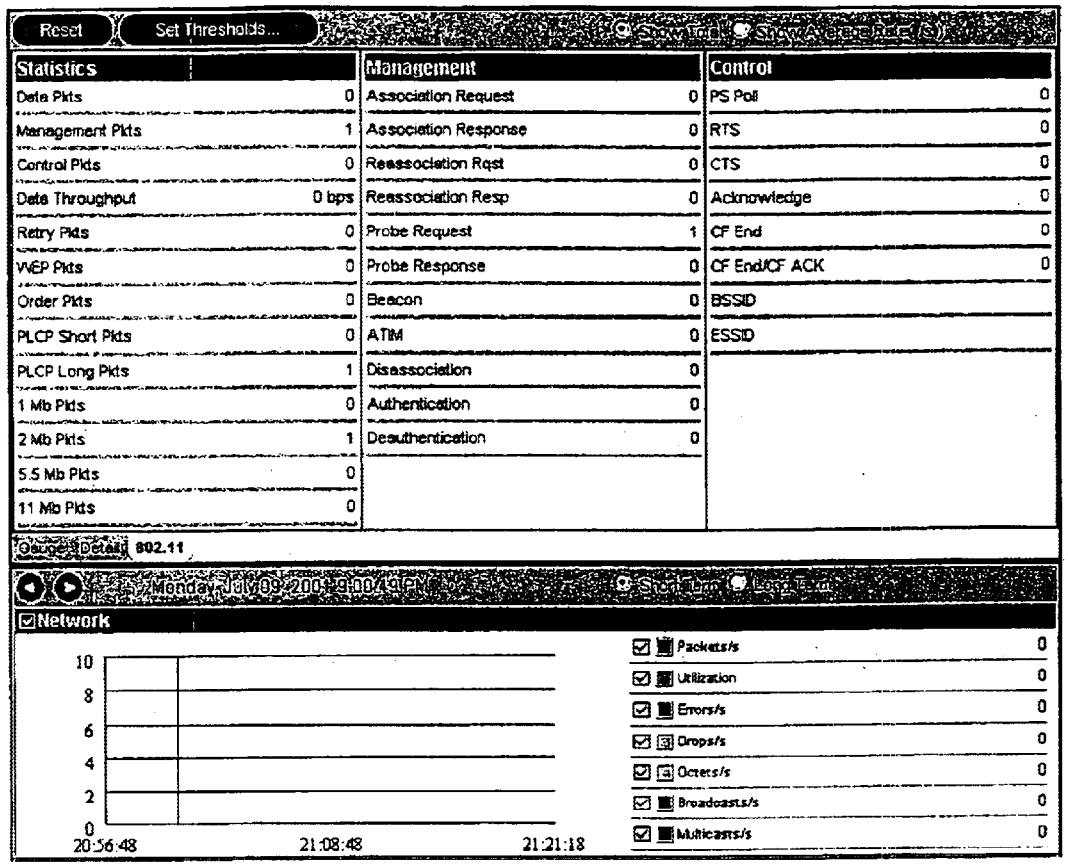
FIG. 24 shows a screen dump or display of the "User Interface of the Sniffer® Wireless Dashboard Statistics Display", for an embodiment of the invention.

Three different screen displays or dumps are provided for respective embodiments of the invention, associated in this example, for use in the User Interface of the Sniffer Wireless Dashboard Statistics display. FIGS. 22, 23 and 24, show first, second, and third screen dumps 2200, 2300, and 2400, respectively. The invention, however, is not meant to be limited to use of these three screen dumps, 2200, 2300, 2400.

The screen display 2200 shown in FIG. 22, provides a user with virtual gauge displays, as shown, for providing an indication of the percent utilization of the network being monitored, the number of packets captured, the number of errors detected, and the throughput, at any given time during monitoring. Also, the display provides for the selection of either short term monitoring for 30 second intervals and 300 intervals, or long term monitoring for 30 minute intervals and 300 intervals period of time. Also displayed is a section entitled "Network" for directly displaying the numbers associated with the various parameters presented in columnar format. The bottommost section, Detail Errors, similarly displays total numbers for the parameters shown in columnar form. Note that PLCP is defined as Physical Layer Conversions Protocol. CRCs/s is defined as Cyclic Redundancy Check, and WEP ICV/s is defined as Wired Equivalent Privacy Integrity Check Value. The screen display 2300 displays some of the information provided in the screen display 2200, and additional information, all in a different display configuration. Similarly, the screen display 2400 shows some of the same information as the other two displays, and additional information, as indicated.

Note that the present invention as used in Sniffer® Wireless product, is provided via the addition thereto of a 802.11 tab on what is known as a dashboard display. When a user addresses this tab, it permits them to then obtain the aforesaid displays from a menu to visually viewing vital statistical data associated with the Wireless LAN (IEEE 802.11) Topology. By selecting from amongst the displays 2200, 2300, or 2400, the user will be able to troubleshoot various problems that are occurring on the associated Wireless LAN, and can also use the information to improve the efficiency of the Wireless LAN by eliminating excessive overlaps, and by ensuring that access points (AP) are added to areas not presently covered.

With particular reference to the screen display 2400 (see FIG. 24), certain of the information provided will be described. "Data PKTS" are the number of packets transmitted containing only user data (non-management and non-control). "Management Pkts" are the number of packets containing data relating to managing the 802.11 Network. In the display example given, one packet is indicated as representing the sum of all of the data under the "Management" category. "Control Pkts" are the number of packets containing data relating to controlling the Network. The number that is indicated at any given time represents the sum of all of the data under the "Control" category, except for the BSSID and ESSID categories, which are separately indicated in the "Control" column. "WEP Pkts" are the number of packets associated with the Wired Equivalent Privacy (WEP) bits set. "1 MB Pkts, 2 MB Pkts, 5.5 MB Pkts, and 11 MB Pkts", respectively, represent the number of packets transmitted at the indicated respective rates. In the column labeled "Control", the "BSSID" (Basic Service Set identification) is a six byte address of a particular access point. The first three bytes represent the manufacturer ID as designated by the IEEE (Institute of Electrical and Electronic Engineers). The Sniffer® Wireless uses a table lookup to represent a 6 character abbreviation of the manufacturer's name. If the manufacturer's name for the 3 byte manufacturer ID is not present then the 6 hexadecimal characters for the 3 byte value is displayed. The BSSID display represents the field of the last packet analyzed whose 802.11 Type is Management, and whose 802.11 Sub-type is Beacon. The "ESSID" (Extended Service Set Identification) is a thirty-two character field which is the 802.11 network name used to group multiple Access Points represented by multiple BSSID'S into the same logical network. The ESSID display represents the field of the last packet analyzed whose 802.11 Type is Management, and whose Sub-type is Beacon. In the "Management" column, the types of packets being captured is shown by the total number captured at a given time. Note that the "Beacon" chose the number of access points being monitored. Further note that the information shown in the "Statistics, Management, and Control" columns can only be observed from the wireless side via the wireless analyzer being used as programmed with the present invention.

The display screens 2200, 2300, and 2400, are, updated on a predetermined time basis of approximately once per second, in this example. The data used to update the values displayed on the screen are obtained from predetermined locations or assigned locations within a memory of the particular analyzer being used.

The following information is believed helpful in fostering one's understanding of the environment the present invention is used in, and for further illustrating various aspects of the invention. Note that in an IEEE 802.11 MAC (Medium Access Control) Header, a Frame Control Field (FCF) is presented. The FCF contains a type and Sub-type field, for identifying the type of packet. As previously indicated, the packets are typically of three types, Data Packets, Management Packets, and Control Packets.

The function of Management Packets will now be described. IEEE 802.11 Management Frames are defined in Section 7 of the IEEE 802.11 Specification. These frames are used to allow IEEE 802.11 Stations (Access Points and Client Adapters) to exchange management information about the network to ensure that client adapters and access points within the same logical network are able to communicate with one another. For example, a public area such as an airport, may have several logical networks. Typically, a Wireless LAN may be maintained at the airport facility. Airline lounges maintained at the airport for frequent flyers may include a Wireless LAN. Also, it may be possible that a coffee house within the airport facility may have a Wireless LAN. The management frames can be utilized to allow client adapters to associate and communicate on any one or combination of the aforesaid examples of three Wireless LANs, assuming that the users have permission to communicate within one or more of the aforesaid Wireless LANs.

The function of Control Packets is to control the flow of Data Packets within a IEEE 802.11 network. Control packets indicate the successful receipt of information, and provide a method for the wireless stations to access the medium.

Other types of packets as shown in the screen display of FIG. 24 include PS Poll (power save mode); RTS (request to send); CTS (clear to send); ACK (acknowledge); CF AND (contention free and); ATIM (announcement traffic indication message); and WEP PKTS (wired equivalent privacy packets).

The present invention is primarily designed for application in a Wireless LAN environment. A Wireless LAN dashboard has specific statistics associated with the related operating environment.

A Sniffer® Wireless analyzer, as previously mentioned, is configured to connect to multiple Wireless LAN adapters. Each adapter can monitor a single channel at a time. The channel frequency spectrum and spacings are defined in the IEEE 802.11 Specification Section 15.4.

In the examples given herein, in association with the dashboard of a wireless analyzer, such as the Sniffer® Wireless, it can be used to identify the state of the LAN being monitored. Certain of the information obtained is useful in troubleshooting the associated Network. Other information obtained is useful in identifying the capacity of the network, and its utilization. For example, the identified errors provide information on the total number of bad packets. A Retry Counter (not shown) provides a user with information pertaining to the amount of data that has been resent due to failure of the receiving station to acknowledge the received data. The previously mentioned Speed distribution statistics (1 Mbps, 2 Mbps, 5.5 Mbps, and 11 Mbps) packet counters are used to determine the percentage of data which has been transmitted at each of these speeds. The data throughput indicator provides an indication of the total amount of 11 Mbps available throughput being utilized. The Management Statistics permit a user to determine how many stations are potentially trying to gain access to the LAN being monitored.

Note that only the IEEE 802.11 Data Frames are transmitted to the wired side of an Access Point. All of the IEEE 802.11 Management and Control Frames, Speed Distribution, and IEEE 802.11 errors are not available on the wired side of the LAN being monitored.

An "802.11 TAB" is shown in the screen display of FIG. 22. A user addresses this tab, illustrated as "Detail 802.11", to obtain the specific statistics on the dashboard, and a display thereof.

In the present invention, Set Thresholds are used to set thresholds for alarms. If any of the statistics calculated in the dashboard exceed a specific rate for a given time period, an alarm is generated in an Alarm Log. The statistics provided in the dashboard can be displayed as total amount over the time period since resetting the analyzer to begin a new session, or the statistics can be displayed as an average per second.

Although various of the embodiments of the invention have been shown and described, they are not meant to be limiting. Those of skill in the art may recognize certain modifications to these embodiments, which are meant to be covered by the spirit and scope of the claims appended herewith.

What we claim is:

1. A method for operating and programming a wireless analyzer device for an IEEE 802.11 wireless LAN, said method comprising the steps of:
   performing a per packet processing routine to obtain packet statistics;
   performing a one second timer routine;
   arranging the packet statistics in a logical manner for display on a computer monitor;
   wherein said step of per packet processing routine includes the steps of:
   acquiring out of band packet information;
   acquiring packet data;
   determining whether wired equivalent privacy (WEP) is enabled;
   decrypting a data portion of a captured frame and validating a WEP integrity check value (ICV), in response to enablement of WEP; and
   processing packet statistics either in response to disablement of WEP, or to decryption of the data portion of a frame.

2. The method of claim 1, wherein said step of acquiring out of band packet information includes the steps of:
   reading the packet length in bytes;
   reading the packet status relative to the associated cyclic redundancy code (CRC) and short preamble;
   reading the packet physical layer convergence protocol (PLCP) service field;
   reading the packet PLCP signal field; and
   reading the packet duration.

3. The method of claim 1, wherein said one second timer routine includes the steps of:
   calculating network utilization;
   calculating data packet throughput; and
   calculating per second statistics.

4. The method of claim 1, wherein said step of processing packet statistics includes the steps of:
   accumulating general statistics;
   accumulating size distribution;
   accumulating detail errors;
   accumulating packet physical layer convergence protocol (PLCP) header statistics; and
   accumulating IEEE 802.11 statistics.

5. The method of claim 4, wherein said step of accumulating general statistics includes the steps of:
   accumulating packet length into TOTAL_BYTES;
   incrementing TOTAL PACKETS;
   incrementing PACKETS_THIS_SECOND;
   incrementing packet duration into Total Packet Duration;
   determining whether a frame is multicast;
   determining whether the frame is Broadcast;
   incrementing MULTICAST_PKTS if the frame is Multicast and not Broadcast; and
   incrementing BROADCAST_PKTS if the frame is Broadcast.

6. The method of claim 4, wherein the step of accumulating size distribution includes the steps of;
   determining whether the frame length is less than 14 bytes, and if so increment UNDERSIZE_PKTS;
   determining in response to the frame length being greater than or equal to 14 bytes, whether the frame length is less than 64 bytes, and if so increment TOTAL_14_63_PKTS;
   determining, in response to the frame being greater than or equal to 64 bytes, whether the frame length is less than 128 bytes, and if so increment TOTAL_64_127_PKTS;
   determining, in response to the frame length being equal to or greater than 128 bytes, whether the frame length is less than 256 bytes, and if so increment TOTAL_128_255_PKTS; and
   accumulating size distribution 2 in response to the frame length being equal to or greater than 256 bytes.

7. The method of claim 6, wherein the step of accumulating size distribution 2 includes the steps of:
   determining whether the frame length is less than 512 bytes, and if so increment TOTAL_252_511_PKTS;
   determining, in response to the frame length being greater than or equal to 512 bytes, whether the frame length is less than 1024 bytes, and if so increment TOTAL_512_1023_PKTS;
   determining, in response to the frame length being equal to or greater than 1024 bytes, whether the frame length is less than 2048 bytes, and if so increment TOTAL_1024_2047_PKTS;
   determining, in response to the frame length being equal to or greater than 2048 bytes, whether the frame length is greater than 2346 bytes, and if so increment TOTAL_2048_2346_PKTS; and
   incrementing OVERSIZE_PKTS in response to the frame length being equal to or greater than 2346 bytes.

8. The method of claim 4, wherein the step of accumulating detail errors includes the steps of:
   determining if a frame error is cyclic redundancy code (CRC), and if so increment both TOTAL_CRC_ERRS, and ERROR_THIS_SECOND;
   determining, in response to a frame error not being CRC, whether a frame error is physical layer convergence protocol (PLCP), and if so increment both TOTAL PLCP ERRS, and ERRORS THIS SECOND;
   determining, in response to a frame error not being PLCP, whether a frame needs decryption; and
   determining, in response to a frame needing decryption, whether there was a WEP ICV error during decryption, and if so increment both TOTAL_WEPICV_ERRS, and ERRORS_THIS_SECOND.

9. The method of claim 4, wherein the steps of accumulating PLCP header statistics includes the steps of:
   determining if a frame signal is transmitted at a speed of 1 Mbps Barker Code, and if so, increment TOTAL_1 MBPS_PKTS;
   determining, in response to the frame not being a 1 Mbps frame, if the frame is a 2 Mbps Barker Code frame, and if so, increment TOTAL_2 MBPS_PKTS;
   determining, in response to the frame not being a 2 Mbps Barker Code frame, if the frame is a 5.5 Mbps CCK frame, and if so, increment TOTAL_5_5 MBPS_PKTS;
   determining, in response to the frame not being a 5.5 Mbps CCK frame, if the frame is an 11 Mbps CCK frame, and if so, increment TOTAL_11 MBPS_PKTS; and
   accumulating PLCP Header Statistics 2.

10. The method of claim 9, wherein the step of accumulating PLCP Header Statistics 2 includes the steps of:
    determining is a frame PLCP is a short PLCP, and if so, increment TOTAL_SHORT_PLCPS;

determining, in response to the frame not being a short PLCP, if the frame is a long PLCP, and if so, increment TOTAL_LONG_PLCPS; and accumulating frame duration into TOTAL_PACKET_MICROSECONDS.

11. The method of claim 4, wherein said step of accumulating IEEE 802.11 statistics includes the steps of:

determining if the frame control field wired equivalent privacy (FCF.WEP) is set, and if so, increment the variable TOTAL_WEP_PKTS;

determining if the FCF.RETRY is set, and if so, increment the variable TOTAL_RETRY_PKTS;

determining if the FCF.ORDER is set, and if so, increment the variable TOTAL_ORDER_PKTS; and accumulating IEEE 802.11 Packet Data Statistics 2.

12. The method of claim 11, wherein said step of accumulating IEEE 802.11 Packet Data Statistics 2 includes the steps of:

determining if the frame control field type (FCF.TYPE) contains a value indicating that the IEEE 802.11 frame is a Data frame;

responding to the FCF.TYPE being Data, by successively incrementing TOTAL_DATA_PKTS, and accumulating Packet Length into TOTAL_DATAPACKET_BYTES;

determining, in response to the FCF.TYPE not being Data, if the FCF.TYPE is Management;

responding to the FCF.TYPE being Management, by successively incrementing TOTAL_MGMT_PKTS, and accumulating IEEE 802.11 Management Statistics;

determining, in response to the FCF.TYPE not being Management, if the FCF.TYPE is Control; and responding to the DCF.TYPE being Control, by successively incrementing TOTAL_CTRL_PKTS, and accumulating IEEE 802.11 Control Statistics.

13. The method of claim 12, wherein the step of accumulating IEEE 802.11 Control Statistics includes the steps of:

determining if the FCF.SUBTYPE is a Power Save Poll (PS-POLL), and if so, increment TOTAL_PSPOLL_PKTS;

determining in response to the FCF.SUBTYPE not being PS-POLL, if the FCF.SUBTYPE is an Acknowledgment (ACK), and if so, increment TOTAL-ACK_PKTS;

determining, in response to the FCF.SUBTYPE not being ACK, if it is a Request To Send (RTS), and if so, increment TOTAL_RTS_PKTS;

determining, in response to the FCF.SUBTYPE not being RTS, if it is a Clear To Send (CTS), and if so, increment TOTAL_CTS_PKTS;

determining, in response to the FCF.SUBTYPE not being CTS, if it is a contention Free End (CF-END), and if so, increment TOTAL_CFEND_PKTS; and determining in response to the FCF.SUBTYPE not being CF END, if it is CF END/CFACK, and if so, increment TOTAL_CFEND_CFACK_PKTS.

14. The method of claim 12, wherein the step of accumulating IEEE 802.11 Management Statistics includes the steps of:

determining if the Frame Control Field Subtype is an Association Request (FCF.SUBTYPE ASSOC REQ), and if so, increment TOTAL_ASSOC_REQS;

determining, in response lo the FCF.SUBTYPE not being ASSOC REQ, if it is an Association Response (ASSOC RESP), and if so, increment TOTAL_ASSOC_RESP;

determining, in response to the FCF.SUBTYPE not being an ASSOC RESP, if it is a Reassociation Response (REASSOC RESP), and if so, increment TOTAL_REASSOC_RESP; and accumulating Management Packet Statistics 2 in response to the FCF.SUBTYPE not being a REASSOC RESP.

15. The method of claim 14, wherein said step of accumulating Management Packet Statistics 2 includes the steps of:

determining if the FCF.SUBTYPE is an Authentication, and if so, increment TOTAL_AUTH_REQS;

determining, in response to No for the previous step, if the FCF.SUBTYPE is a Deauthentication, and if so, increment TOTAL_DEAUTH_REQS;

determining, in response to No for the immediately previous step, if the FCF.SUBTYPE is a PROBE REQ, and if so, increment TOTAL_PROBE_REQS;

determining, in response to No for the immediately previous step, if the FCF.SUBTYPE is a PROBE RESP, and if so, increment TOTAL_PROBE_RESP; and accumulating Management Packet Statistics 3, in response to the FCF.SUBTYPE not being a PROBE RESP.

16. The method of claim 15, wherein said step of accumulating Management Packet Statistics 3 includes the steps of:

determining if the FCF.SUBTYPE is a Disassociation, and if so, increment TOTAL_DISASSOCATIONS;

determining, in response to No for the previous step, if the FCF.SUBTYPE is an announcement traffic indication message (ATIM), and if so, increment TOTAL_ATIM_PKTS; and determining, in response to No for the immediately previous step, if the FCF.SUBTYPE is a Beacon, and if so, both successively increment TOTAL_BEACON_PKTS, and then extract Extended Service Set Identification (ESSID) and Basic Service Set identification (BSSID).

17. A method for operating and programming a wireless analyzer device for an IEEE 802.11 wireless LAN, said method comprising the steps of:

performing a per packet processing routine to obtain packet statistics;

performing a one second timer routine;

arranging the packet statistics in a logical manner for display on a computer monitor;

wherein said one second timer routine includes the steps of:

calculating network utilization;

calculating data packet throughput; and calculating per second statistics;

wherein said step of calculating networks utilization includes the steps of:

determining if TOTAL_PACKET_MICROSECONDS is non-zero, indicating packets were received in the previous second;

calculating, in response to Yes for the previous determining step, the previous 1 second network utilization by dividing 1,000,000 into TOTAL_PACKET_MICROSECONDS, and multiplying the result by 100 to provide percent utilization;

resetting TOTAL_PACKET_MICROSECONDS to zero, after completing said calculating step; and terminating the step of calculating network utilization, either in response to said determining step showing TOTAL_PACKET_MICROSECONDS is zero, or immediately after said resetting step.

18. A method for operating and programming a wireless analyzer device for an IEEE 802.11 wireless LAN, said method comprising the steps of:

performing a per packet processing routine to obtain Packet statistics;

performing a one second timer routine;

arranging the packet statistics in a logical manner for display on a computer monitor;

wherein said one second timer routine includes the steps of:
calculating network utilization;
calculating data packet throughput; and
calculating per second statistics;
wherein said step of calculating data packet throughput includes the steps of:
determining if TOTAL_DATAPACKET_BYTES is non-zero indicating at least some of received packets are Data Packets in the IEEE 802.11 Frame Control Field (FCF);
calculating, in response to Yes in the previous determining step, the previous 1 second Data Throughput by multiplying the total number of bytes by 8 to obtain the total number of bits transmitted in the previous second;
resetting, after said calculating step, the TOTAL_DATAPACKET_BYTES to zero; and
terminating said step of calculating data packet throughput either after said resetting step, or said determining step finding TOTAL_DATAPACKET_BYTES is zero.

19. A method for operating and programming a wireless analyzer device for an IEEE 802.11 wireless LAN, said method comprising the steps of:

performing a per packet processing routine to obtain packet statistics;

performing a one second timer routine;

arranging the packet statistics in a logical manner for display on a computer monitor;

wherein said one second timer routine includes the steps of:
calculating network utilization;
calculating data packet throughput; and
calculating per second statistics;
wherein said step of calculating per second statistics provides errors and packets per second, and includes the steps of:
determining if the variable ERRORS_THIS_SECOND is unequal to zero;
setting, in response to Yes in the previous step, the last ERRORS_PER_SECOND value to equal the variable ERRORS_THIS_SECOND;
resetting the ERRORS_THIS_SECOND to zero in response to either said setting step, or to the last said determining step answer being No;
determining if the variable PACKET_THIS_SECOND is non-zero;
setting, in response to the PACKET_THIS_SECOND being non-zero, the value of the variable PACKETS_THIS_SECOND; and
resetting the PACKETS_PER_SECOND to zero, in response to either the immediately preceding setting step, or to No in the immediately preceding determining step.

* * * * *